(12) United States Patent
Uenodai et al.

(10) Patent No.: US 7,413,044 B2
(45) Date of Patent: Aug. 19, 2008

(54) CONTROL APPARATUS FOR FUEL CELL VEHICLE AND CONTROL METHOD FOR FUEL CELL VEHICLE

(75) Inventors: Asao Uenodai, Rancho Palos Verdes, CA (US); Takuya Shirasaka, Shioya-gun (JP); Tohru Ikeda, Utsunomiya (JP); Hisanori Yanagida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 175 days.

(21) Appl. No.: 11/479,004

(22) Filed: Jun. 30, 2006

(65) Prior Publication Data

US 2007/0007058 A1    Jan. 11, 2007

(30) Foreign Application Priority Data

Jul. 5, 2005    (JP)    ............... 2005-196186

(51) Int. Cl.
*B60K 1/00*    (2006.01)
(52) U.S. Cl. .................. 180/65.3; 180/65.8; 903/908
(58) Field of Classification Search ............... 180/65.1, 180/65.3, 65.6, 65.8, 65.5, 301, 302; 318/139, 318/376, 432, 382, 729; 903/916, 918, 940, 903/908; 303/152, 163, 20, 151; 701/22
See application file for complete search history.

(56) References Cited

U.S. PATENT DOCUMENTS

| | | | | |
|---|---|---|---|---|
| 6,380,638 B1* | 4/2002 | Bitsche et al. | ............ | 290/40 C |
| 6,388,419 B1* | 5/2002 | Chen et al. | ............... | 318/727 |
| 6,452,352 B1* | 9/2002 | Farkas | ........................ | 318/139 |
| 6,580,977 B2* | 6/2003 | Ding et al. | .................... | 701/22 |
| 6,615,940 B2* | 9/2003 | Morisawa | ................... | 180/65.1 |
| 6,631,960 B2* | 10/2003 | Grand et al. | ................. | 303/152 |
| 2003/0184147 A1* | 10/2003 | Perach | ......................... | 303/20 |

FOREIGN PATENT DOCUMENTS

JP    2001-204107    7/2001

* cited by examiner

*Primary Examiner*—Hau V Phan
(74) *Attorney, Agent, or Firm*—Lahive & Cockfield, LLP; Anthony A. Laurentano, Esq.

(57) ABSTRACT

A control apparatus for a fuel cell vehicle includes: a motor for driving the fuel cell vehicle; a motor control unit controlling driving and regenerative operations of the motor; a traction control unit suppressing slippage of drive wheels by controlling a driving force acting between tires and a road surface; a fuel cell generating electricity through electrochemical reaction by being supplied with reactant gases by a reactant gas supply unit and supplies electrical power to the motor; an electrical storage apparatus charged by power generated by the fuel cell and power regenerated by the motor; an output control unit controlling the output of the fuel cell; and a control unit controlling power consumption of the motor in advance of a change in a supply state of the reactant gases to the fuel cell due to execution of driving force control by the traction control unit.

18 Claims, 19 Drawing Sheets

CONTROL APPARATUS FOR FUEL CELL VEHICLE AND CONTROL METHOD FOR FUEL CELL VEHICLE

BACKGROUND OF THE INVENTION

1. Field of the Invention

The present invention relates to a control apparatus for a fuel cell vehicle and a control method for a fuel cell vehicle.

Priority is claimed on Japanese Patent Application No. 2005-196186, filed Jul. 5, 2005, the content of which is incorporated herein by reference.

2. Description of Related Art

There is conventionally known a control apparatus that performs traction control to suppress slippage of drive wheels due to excessive driving force being applied from the tires to the road surface in a vehicle equipped with a fuel cell and an electrical storage apparatus as a power supply for the vehicle traction motor (refer, for example, to Japanese Unexamined Patent Application, First Publication No. 2001-204107). This control apparatus restricts the electrical power supplied from the fuel cell to the vehicle traction motor by restricting the fuel supplied to the fuel cell, whereby the output of the vehicle traction motor is restricted to increase the grip force of the drive wheels.

In the control apparatus according to the aforementioned prior art, after an appropriate control command is input with respect to the supply state (i.e., pressure, flow rate, etc.) of the fuel containing a fluid substance in a gas or liquid state supplied to the fuel cell, the time, i.e., response delay, until reaching the control state in accordance with this control command becomes relatively long.

For this reason, from the moment slippage of the drive wheels is detected, the time required for output of the vehicle traction motor to be actually restricted for the grip of the drive wheels to increase is lengthened, leading to difficulty in executing traction control with suitable timing.

Moreover, when the output of the vehicle traction motor rapidly increases, such as when the tires slip on a road surface with a relatively low frictional resistance due to freezing or the like, there is the risk of electrical power exceeding a specified upper limit power from the fuel cell and an electrical storage apparatus during the time from the detection of the output surge to restricting the electrical power supplied to the traction motor by restricting the supply state of fuel to the fuel cell. This gives rise to the risk of being unable to suitably protect the fuel cell and the electrical storage apparatus.

SUMMARY OF THE INVENTION

The present invention was achieved in view of the aforementioned circumstances, and an object thereof is to provide a control apparatus for a fuel cell vehicle and a control method for a fuel cell vehicle that can execute traction control at a suitable timing while suitably protecting the fuel cell in a fuel cell vehicle equipped with a fuel cell as a power supply for a vehicle traction motor.

In order to solve the aforementioned problems and achieve object concerned, the present invention proposes a control apparatus for a fuel cell vehicle including: a motor for driving the fuel cell vehicle; a motor control unit that controls driving and regenerative operations of the motor; a traction control unit that suppresses slippage of drive wheels by controlling driving force acting between tires and a road surface; a fuel cell that generates electricity through electrochemical reaction by being supplied with reactant gases by a reactant gas supply unit and supplies electrical power to the motor; an electrical storage apparatus that is charged by power generated by the fuel cell; and power regenerated by the motor; an output control unit that controls the output of the fuel cell; and a control unit that controls power consumption of the motor in advance of a change in a supply state of the reactant gases to the fuel cell due to execution of driving force control by the traction control unit.

According to the control apparatus for the aforementioned fuel cell vehicle, accompanying the start of execution of traction control to suppress slippage of the drive wheels caused by excessive drive being applied from the tires to the road surface, the power consumption of the motor is controlled by the control unit in advance of a change in the supply state of reactant gases supplied to the fuel cell by, for example, control of the reactant gas supply unit being started by the output control unit.

Thereby, execution of control of the power consumption of the motor, which has a relatively short response delay, can be promptly started independently of control of the supply state of reactant gases, which have a relatively long response delay, and the motor output can be directly controlled with adequate accuracy (that is, irrespective of the supply state of the reactant gases to the fuel cell), so the grip force can be appropriately increased immediately even, for example, when slippage of the wheels has occurred.

The control apparatus may control the supply state of the reactant gases in accordance with the power consumption of the motor when driving force control is executed by the traction control unit.

According to the control apparatus for the aforementioned fuel cell vehicle, in the state of the driving force of the motor being controlled by the traction control unit, because the supply state of the reactant gases is controlled in accordance with the power consumption of the motor, the generated power of the fuel cell is prevented from becoming excessive or increasing unnecessarily, and a drop in the energy efficiency of the fuel cell vehicle as a whole due to losses when charging the surplus portion of generated power of the fuel cell to the electrical storage apparatus can be prevented.

The control apparatus may further include a revolution rate sensor that measures a revolution rate of the motor, and the control unit may compute the power consumption of the motor based on a torque command for torque output from the motor and on the revolution rate measured by the revolution rate sensor.

According to the control apparatus for the aforementioned fuel cell vehicle, the torque command for torque output from the motor is set so as to have the same value as the smaller of the driver-requested torque and the torque required for traction, with the former corresponding to the accelerator opening degree according to the accelerator manipulated variable of the driver, and the latter corresponding to the driving force control by the traction control unit.

Thereby, when executing driving force control by the traction control unit, even in the state of the driver-requested torque being greater than the torque required for traction, the driving force of the motor is suitably reduced so that the grip force of the drive wheels can be suitably increased.

Because the power consumption of the motor for controlling the supply state of the reactant gases is computed based on the torque command and revolution rate of the motor, the generated power of the fuel cell can be appropriately set in accordance with the operating state of the motor.

The control apparatus may further include: a revolution rate sensor that measures a revolution rate of the motor; and an accelerator opening degree sensor that measures an accelerator opening degree corresponding to an amount of operation of an accelerator applied by a driver, and the control unit may compute, when executing driving force control by the traction control unit, the power consumption of the motor based on a traction-control-requested torque corresponding to the driving force control by the traction control unit, which is a command value for torque output from the motor, and on the revolution rate measured by the revolution rate sensor, and may compute, when driving force control is not executed by the traction control unit, the power consumption of the motor based on a driver-requested torque corresponding to the accelerator opening degree measured by the accelerator opening degree sensor, which is a command value for torque output from the motor, and on the revolution rate measured by the revolution rate sensor.

According to the control apparatus for the aforementioned fuel cell vehicle, when driving force control is executed by the traction control unit, the or consumption of the motor is sat in accordance with the torque required for traction and the revolution rate of the motor irrespective of the driver-requested torque. On the other hand, when driving force control is not executed by the traction control unit the power consumption of the motor is set in accordance with the driver-requested torque and the revolution rate of the motor irrespective of the drive-requested torque. Thereby, the power consumption of the motor for controlling the supply state of the reactant gases can be set in accordance with whether or not traction control is being executed, and the generated power of the fuel cell can be suitably set in accordance with whether or not traction control is being executed.

The control apparatus may control a supply state of the reactant gases when driving force control is executed by the traction control unit, irrespective of the driving force of the motor.

According to the control apparatus for the aforementioned fuel cell vehicle, even in the state of the driving force of the motor being controlled by the traction control unit, the supply state of the reactant gases is controlled independently of the driving force of the motor. Therefore, when, for example, driving force control is executed by the traction control unit, the electrical output of the fuel cell is prevented from decreasing in accordance with the driving force of the motor being restricted. For this reason, even, for example, while the restriction on the driving force of the motor is released following the completion of execution of driving force control by the traction control unit and the driving force of the motor abruptly increases as a result of the driving intention of the driver being reflected in the driving force of the motor, the power consumption of the motor at this point can be covered by the electrical output of the fuel cell, and a shortage in the supply of reactant gases to the fuel cell due to the power consumption of the motor exceeding the electrical output of the fuel cell can be prevented during the period until the electrical output of the fuel cell is increased by controlling the supply state of the reactant gases having a relatively longer response delay. Thereby, hastening of degradation of the fuel cell due to an excessive electrical current command being placed on the fuel cell leading to a shortage in the supply of reactant gases can be prevented.

The control apparatus may fiber include an accelerator opening degree sensor that measures an accelerator opening degree corresponding to an amount of operation of an accelerator applied by a driver, and the control unit may control the supply state of the reactant gases in accordance with the accelerator opening degree measured by the accelerator opening degree sensor when driving force control is executed by the traction control unit.

According to the control apparatus for the aforementioned fuel cell vehicle, even in the state of the driving force of the motor being controlled by the traction control unit, the supply state of the reactant gases is controlled in accordance with the accelerator opening degree, which corresponds to the accelerator manipulated variable of the driver, independently of the driving force of this motor. Therefore, when for example returning from the state of executing driving force control by the traction control unit, that is, when shifting from the state of the driving force of the motor changing in accordance with the torque required for traction in action control to the state of the driving force of the motor changing in accordance with the driver-requested torque corresponding to the accelerator opening degree, even in the event of the driving force of the motor abruptly increasing a shortage in the generated power of the fuel cell, that is, a shortage in the supply of reactant gases, is prevented, and so hastening of degradation of the fuel cell can be prevented.

The control apparatus may further include a revolution rate sensor that measures the revolution rate of the motor, and wherein the control unit computes the power consumption of the motor based on the driver-requested torque corresponding to the accelerator opening degree measured by the accelerator opening degree sensor, which is a command value for torque output from the motor, and the revolution rate measured by the revolution rate sensor.

According to the control apparatus for the aforementioned fuel cell vehicle, even in the state of the driving force of the motor being controlled by the traction control unit, the power consumption of the motor is set based on the driver-requested torque and the revolution rate of the motor. Therefore, when for example returning from the state of executing driving force control by the traction control unit, that is, when shifting from the state of the driving force of the motor changing in accordance with the torque required for traction in traction control to the state of the driving force of the motor changing in accordance with the driver-requested torque, shortages in the generated power of the fuel cell, that is, shortages in the supply of the reactant gases, due to an abrupt increase in the power consumption of the motor, are prevented, and so hastening of degradation of the fuel cell can be prevented.

Moreover, since the supply stale of the react gases to the fuel cell changes depending on the power consumption of the motor, the operating state (for example, an operating sound or the like) of the reactant gas supply unit including, for example, an air compressor or the like changes in accordance with the driver-requested torque, so that the driving intention of the driver is suitably reflected in the operating state of the fuel cell vehicle, and the driver is prevented from sensing any incongruity in the operating state of the fuel cell vehicle.

The control apparatus may further include a revolution rate sensor that measures the revolution rate of the motor, and the control unit may compute, when driving force control is executed by the traction control unit, the power consumption of the motor based on a driver-requested torque corresponding to the accelerator opening degree measured by the accelerator opening degree sensor, which is a command value for torque output from the motor, and the revolution rate measured by the revolution rate sensor; and may compute, when driving force control is not executed by the traction control unit, the power consumption of the motor based on a torque command for torque output from the motor, and the revolution rate measured by the revolution rate sensor.

According to the control apparatus for the aforementioned fuel cell vehicle, when driving force control is executed by the traction control unit, the power consumption of the motor is set in accordance with the driver-requested torque and the revolution rate of the motor irrespective of the torque required for traction, which is a command value for torque of the motor in accordance with this driving power control. On the other hand, when driving force control is not executed by the traction control unit the power consumption of the motor is set in accordance with the torque command for torque output from the motor (for example, the driver-requested torque and another command value) and the revolution rate of the motor. Thereby, the supply state of the reactant gases, which changes in accordance with the power consumption state of the motor, can be set in accordance with whether or not traction control is being executed, and the electrical power generated by the fuel cell can be suitably sot in accordance with whether or not traction control is being executed.

The control apparatus may further include a state of charge measuring unit that measures a state of charge of the electrical storage apparatus; and a charging control unit that controls surplus power of an electrical output of the fuel cell exceeding power consumption in an electrical load of the vehicle to be charged to the electrical storage apparatus, in accordance with the state of charge measured by the state of charge measuring unit during execution of the driving force control by the traction control unit.

According to the control apparatus for the aforementioned fuel cell vehicle, even in the state of the driving force of the motor being controlled by the traction control unit, the supply state of the reactant gases is controlled independently of the driving force of the motor. Therefore, a shortage in the generated power of the fuel cell, that is, a shortage in the supply of reactant gases, in which the response delay to an abrupt surge in the driving force of the motor is relatively long, can be prevented, which can prevent hastening of degradation of the fuel cell, and a drop in the energy efficiency of the fuel cell vehicle as a whole can be suppressed.

The present invention further provides a control method for a fuel cell vehicle. The fuel cell vehicle may include: a motor for driving the fuel cell vehicle; a motor control unit that controls driving and regenerative operations of the motor, a traction control unit that suppresses slippage of drive wheels by controlling driving force acting between tires and a mad surface; a fuel cell that generates electricity through electrochemical reaction by being supplied with reactant gases by a reactant gas supply unit and supplies electrical power to the motor, an electrical storage apparatus that is charged by power generated by the fuel cell and power regenerated by the motor; and an output control unit that controls the output of the fuel cell. The control method includes a step of controlling power consumption of the motor in advance of a change in a supply state of the reactant gases to the fuel cell accompanying the start of execution of driving force control by the traction control unit.

According to the control method for the aforementioned fuel cell vehicle, accompanying the start of execution of traction control to suppress slippage of the drive wheels caused by excessive drive being applied from the tires to the road surface, the power consumption of the motor is controlled by the control unit in advance of a change in the supply state of reactant gases supplied to the fuel cell by, for example, control of the reactant gas supply unit being started by the output control unit.

Thereby, execution of control of the power consumption of the motor, which has a relatively short response delay, can be promptly started independently of control of the supply state of reactant gases, which have a relatively long response delay, and the motor output can be directly controlled with adequate accuracy (that is, irrespective of the supply state of the reactant gases to the fuel cell), so the grip force can be appropriately increased immediately even, for example, when slippage of the wheels has occurred.

The above control method may further include a step of controlling the supply state of the reactant gases in accordance with the power consumption of the motor when driving force control is executed by the traction control unit.

According to the control method for the aforementioned fuel cell vehicle, in the state of the driving force of the motor being controlled by the traction control unit, because the supply state of the reactant gases is controlled in accordance with the motor power consumption, the generated power of the fuel cell is prevented from becoming excessive or increasing unnecessarily, and a drop in the energy efficiency of the fuel cell vehicle as a whole can be prevented by losses such as when charging the excess generated power of the fuel cell to the electrical storage apparatus.

The above control method may further include a step of computing the power consumption of the motor based on a torque command for torque output from the motor and on a revolution rate of the motor.

According to the control method for the aforementioned fuel cell vehicle, the torque command for torque output from the motor is set so as to have the same value as the smaller of the driver-requested torque and the torque required for traction, with the former corresponding to the accelerator opening degree according to the accelerator manipulated variable of the driver, and the latter corresponding to the driving force control by the traction control unit.

Thereby, when executing driving force control by the traction control unit, even if the driver-requested torque is greater than the torque required for traction, the driving force of the motor is suitably reduced so that the grip force of the drive wheels can be suitably increased.

Because the power consumption of the motor for controlling the supply state of the reactant gases is computed based on the torque command and revolution rate of the motor, the generated power of the fuel cell can be appropriately set.

The control method may further include a step of computing, when executing driving force control by the traction control unit, the power consumption of the motor based on a traction-control-requested torque corresponding to the driving force control by the traction control unit, which is a command value for torque output from the motor, and on a revolution rate of the motor, and computing, when driving force control is not executed by the traction control unit, the power consumption of the motor based on a driver-requested torque corresponding to an amount of operation of an accelerator applied by a driver, which is a command value for torque output from the motor, and on the revolution rate of the motor.

According to the control method for the aforementioned fuel cell vehicle, when driving force control is executed by the traction control unit, the power consumption of the motor is set in accordance with the torque required for traction and the revolution rate of the motor irrespective of the driver-requested torque. On the other hand, when driving force control is not executed by the traction control unit the power consumption of the motor is set in accordance with the driver-requested torque and the revolution rate of the motor irrespective of the driver-requested torque. Thereby, the power consumption of the motor for controlling the supply state of the reactant gases can be set in accordance with whether or not traction control is being executed, and the generated power of the fuel cell can be suitably set in accordance with whether or not traction control is being executed.

The above control method may further include a step of controlling the supply state of the reactant gases when driving force control is executed by the traction control unit, irrespective of the driving force of the motor.

According to the control method for the aforementioned fuel cell vehicle, even in the state of the driving force of the motor being controlled by the traction control unit, the supply state of the reactant gases is controlled independent of the driving force of the motor. Therefore, when, for example, driving force control is executed by the traction control unit, the electrical output of the fuel cell is prevented from decreasing in accordance with the driving force of the motor being restricted. For this reason, even, for example, while the restriction on the driving force of the motor is released following the completion of execution of driving force control by the action control unit and the driving force of the motor abruptly increases as a result of the driving intention of the driver being reflected in the driving force of the motor, the power consumption of the motor at this point can be covered by the electrical output of the fuel cell, and a shortage in the supply of reactant gases to the fuel cell due to the power consumption of the motor exceeding the electrical output of the fuel cell can be prevented during the period until the electrical output of the fuel cell is increased by controlling the supply state of the reactant gases having a relatively longer response delay. Thereby, hastening of degradation of the fuel cell due to an excessive electrical current command being placed on the fuel cell leading to a shortage in the supply of reactant gases can be prevented.

The above control method may further include a step of controlling the supply state of the reactant gases in accordance with an accelerator opening degree corresponding to an amount of operation of an accelerator applied by a driver when driving force control is executed by the traction control unit.

According to the control method for the aforementioned fuel cell vehicle, even in the state of the driving force of the motor being controlled by the traction control unit, the supply state of the reactant gases is controlled in accordance with the accelerator opening degree, which corresponds to the accelerator manipulated variable of the driver, independent of the driving force of this motor. Therefore, when for example returning from the state of executing driving force control by the traction control unit, that is, when shifting from the state of the driving force of the motor changing in accordance with the torque required for traction in traction control to the state of the driving force of the motor changing in accordance with the driver-requested-torque corresponding to the accelerator opening degree, even in the event of the driving force of the motor abruptly increasing, a shortage in the generated power of the fuel cell, that is, a shortage in the supply of reactant gases, is prevented, and so hastening of degradation of the fuel cell can be prevented.

The above control method may further include a step of computing the power consumption of the motor based on the drive-requested torque corresponding to the accelerator opening degree, which is a command value for torque output from the motor, and on a revolution rate of the motor.

According to the control method for the aforementioned fuel cell vehicle, even in the state of the driving force of the motor being controlled by the traction control unit, the power consumption of the motor is set based on the driver-requested torque and the revolution rate of the motor. Therefore, when for example returning from the state of executing driving force control by the traction control unit, that is, when shifting from the state of the driving force of the motor changing in accordance with the torque required for traction in traction control to the state of the driving force of the motor changing in accordance with the driver-requested torque, shortages in the generated power of the fuel cell, that is, shortages in the supply of the reactant gases, due to an abrupt increase in the power consumption of the motor, are prevented, and so hastening of degradation of the fuel cell can be prevented.

Moreover, since the supply state of the reactant gases to the fuel cell changes depending on the power consumption of the motor, the operate state of the reactant gas supply unit including, for example, an air compressor or the like changes in accordance with the driver-requested torque, so that the driving intention of the driver is suitably reflected in the operating state of the fuel cell vehicle (for example, an operating sound or the like), and the driver is prevented from sensing any incongruity in the operating state of the fuel cell vehicle.

The above control method may further include a step of computing, when driving force control is executed by the traction control unit, the power consumption of the motor based on a driver-requested torque corresponding to the accelerator opening degree, which is a command value for torque output from the motor, and on a revolution rate of the motor, and computing when driving force control is not executed by the traction control unit, the power consumption of the motor based on a torque command for torque output from the motor, and on the revolution rate of the motor.

According to the control method for the aforementioned fuel cell vehicle, when driving force control is executed by the traction control unit, the power consumption of the motor is set in accordance with the driver-requested torque and the revolution rate of the motor irrespective of the torque required for traction, which is a command value for torque of the motor in accordance with this driving power control. On the other hand, when driving force control is not executed by the traction control unit the power consumption of the motor is set in accordance with the torque command for torque output from the motor (for example, the driver-requested torque and another command value) and the revolution rate of the motor. Thereby, the supply state of the reactant gases that changes in accordance with the power consumption state of the motor can be set in accordance with whether or not traction control is being executed, and the electrical power generated by the fuel cell can be suitably set in accordance with whether or not traction control is being executed.

The above control method may further include a step of charging surplus power of an electrical output of the fuel cell exceeding power consumption in an electrical load of the vehicle to the electrical storage apparatus, in accordance with a state of charge of the electrical storage apparatus during execution of the driving force control by the traction control unit.

According to the control method for the aforementioned fuel cell vehicle, even in the state of the driving force of the motor being controlled by the traction control unit, the supply state of the reactant gases is controlled independent of the driving force of the motor. Therefore, a shortage in the generated power, that is, a shortage in the supply of reactant gases, of the fuel cell in which the response delay to an abrupt surge in the driving force of the motor is relatively long, can be prevented, which can prevent hastening of degradation of the fuel cell, and a drop in the energy efficiency of the fuel cell vehicle as a whole can be suppressed.

EFFECTS OF THE INVENTION

As explained above, according to the control apparatus for the fuel cell vehicle of the present invention, execution of control of the power consumption of the motor, which has a relatively short response delay, can be promptly stated independently of control of the supply state of reactant gases, which have a relatively long response delay, and the motor output can be directly controlled with adequate accuracy, so the grip force can be appropriately increased immediately even, for example, when slippage of the wheels has occurred.

In addition, according to the control apparatus for the fuel cell vehicle of the present invention, because the supply state of the react gases is controlled in accordance with the power consumption of the motor, the generated power of the fuel cell can be prevented from becoming excessive or increasing unnecessarily.

In addition, according to the control apparatus for the fuel cell vehicle of the present invention, the generated power of the fuel cell can be appropriately set in accordance with the operating state of the motor.

In addition, according to the control apparatus for the fuel cell vehicle of the present invention, the power consumption of the motor for controlling the supply state of the reactant gases can be set in accordance with whether or not traction control is being executed, and the generated power of the fuel cell can be suitably set in accordance with whether or not traction control is being executed.

In addition, according to the control apparatus for the fuel cell vehicle of the present invention, even in the case that the power consumption of the motor increases with a relatively short response delay in accordance with the driving force of the motor, a shortage in the supply of reactant gases to the fuel cell due to the power consumption of the motor exceeding the electrical output of the fuel cell can be prevented during the period until the electrical output of the fuel cell is increased by controlling the supply state of the reactant gases having a relatively longer response delay. Thereby, hastening of degradation of the fuel cell due to an excessive electrical current command being placed on the fuel cell leading to a shortage in the supply of reactant gases can be prevented.

In addition, according to the control apparatus for the fuel cell vehicle of the present invention, when for example returning from the state of executing driving force control by the traction control unit, that is, even when shifting from the state of the driving force of the motor changing in accordance with the torque required for traction in traction control to the state of the driving force of the motor changing in accordance with the driver-requested torque corresponding to the accelerator opening degree, a shortage in the generated power of the fuel cell, that is, a shortage in the supply of reactant gases, is prevented, and so hastening of degradation of the fuel cell can be prevented.

In addition, according to the control apparatus for the fuel cell vehicle of the present invention, when for example returning from the state of executing driving force control by the traction control unit, that is, when shifting from the state of the driving force of the motor changing in accordance with the torque required for traction in traction control to the state of the driving force of the motor changing in accordance with the driver-requested torque, shortages in the generated power of the fuel cell, that is, shortages in the supply of the reactant gases, due to an abrupt increase in the power consumption of the motor, are prevented, and so hastening of degradation of the fuel cell can be prevented. Moreover, the driving intention of the driver is suitably reflected in the operating state of the fuel cell vehicle (for example, an operating sound or the like), and the driver can be prevented from sensing any incongruity in the operating state of the fuel cell vehicle.

In addition, according to the control apparatus for the fuel cell vehicle of the present invention, the supply state of the reactant gases, which changes in accordance with the power consumption state of the motor, can be set in accordance with whether or not traction control is being executed, and the electrical power generated by the fuel cell can be suitably sot in accordance with whether or not traction control is being executed.

In addition, according to the control apparatus fur the fuel cell vehicle of the present invention, a shortage in the generated power of the fuel cell, that is, a shortage in the supply of reactant gases, can be prevented, which can prevent hastening of degradation of the fuel cell, and a drop in the energy efficiency of the fuel cell vehicle as a whole can be suppressed.

Also, according to the control method for the fuel cell vehicle of the present invention, execution of control of the power consumption of the motor, which has a relatively short response delay, can be promptly started independently of control of the supply state of reactant gas, which have a relatively long response delay, and the motor output can be directly controlled with adequate accuracy, so the grip force can be appropriately increased immediately even, for example, when slippage of the wheels has occurred.

In addition, according to the control method for the fuel cell vehicle of the present invention, because the supply state of the reactant gases is controlled in accordance with the power consumption of the motor, the generated power of the fuel cell can be prevented from becoming excessive or increasing unnecessarily.

In addition, according to the control method for the fuel cell vehicle of the present invention, the generated power of the fuel cell can be appropriately set in accordance with the operating state of the motor.

In addition, according to the control method for the fuel cell vehicle of the present invention, the power consumption of the motor for controlling the supply gate of the reactant gases can be set in accordance with whether or not traction control is being executed, and the generated power of the fuel cell can be suitably set in accordance with whether or not traction control is being executed.

In addition, according to the control method for the fuel cell vehicle of the present invention, even in the case that the power consumption of the motor increases with a relatively short response delay in accordance with the driving force of the motor, a shortage in the supply of reactant gases to the fuel cell due to the power consumption of the motor exceeding the electrical output of the fuel cell can be prevented during the period until the electrical output of the fuel cell is increased by controlling the supply state of the reactant gases having a relatively longer response delay. Thereby, hastening of degradation of the fuel cell due to an excessive electrical current command being placed on the fuel cell leading to a shortage in the supply of reactant gases can be prevented.

In addition, according to the control method for the fuel cell vehicle of the present invention, when for example returning from the state of executing driving force control by the traction control unit, that is, even when shifting from the state of the driving force of the motor changing in accordance with the torque required for traction in traction control to the state of the driving force of the motor changing in accordance with the driver-requested torque corresponding to the accelerator opening degree, a shortage in the generated power of the fuel cell, that is, a shortage in the supply of reactant gases, is prevented, and so hastening of degradation of the fuel cell can be prevented.

In addition, according to the control method for the fuel cell vehicle of the present invention, even when shifting from the state of the driving force of the motor changing in accordance with the torque required for traction in traction control to the state of the driving force of the motor changing in accordance with the driver-requested torque, shortages in the generated power of the fuel cell, that is, shortages in the supply of the reactant gases, due to an abrupt increase in the power consumption of the motor, are prevented, and so hastening of degradation of the fuel cell can be prevented. Moreover, the driving intention of the driver is suitably reflected in the operating slate of the fuel cell vehicle (for example, an operating sound or the like), and the driver can be prevented from sensing any incongruity in the operating state of the fuel cell vehicle.

In addition, according to the control method for the fuel cell vehicle of the present invention, the supply state of the reactant gases, which changes in accordance with the power consumption state of the motor, can be set in accordance with whether or not traction control is being executed, and the electrical power generated by the fuel cell can be suitably set in accordance with whether or not traction control is being executed.

In addition, according to the control method for the fuel cell vehicle of the present invention, a shortage in the generated power of the fuel cell, that is, a shortage in the supply of reactant gases, can be prevented, which can prevent haste of degradation of the, fuel cell, and a drop in the energy efficiency of the fuel cell vehicle as a whole can be suppressed.

DETAILED DESCRIPTION OF THE INVENTION

A control apparatus for a fuel cell vehicle and a control method for a fuel cell vehicle according to a first embodiment of the present invention shall be described below with reference to the attached drawings.

Figure 1:
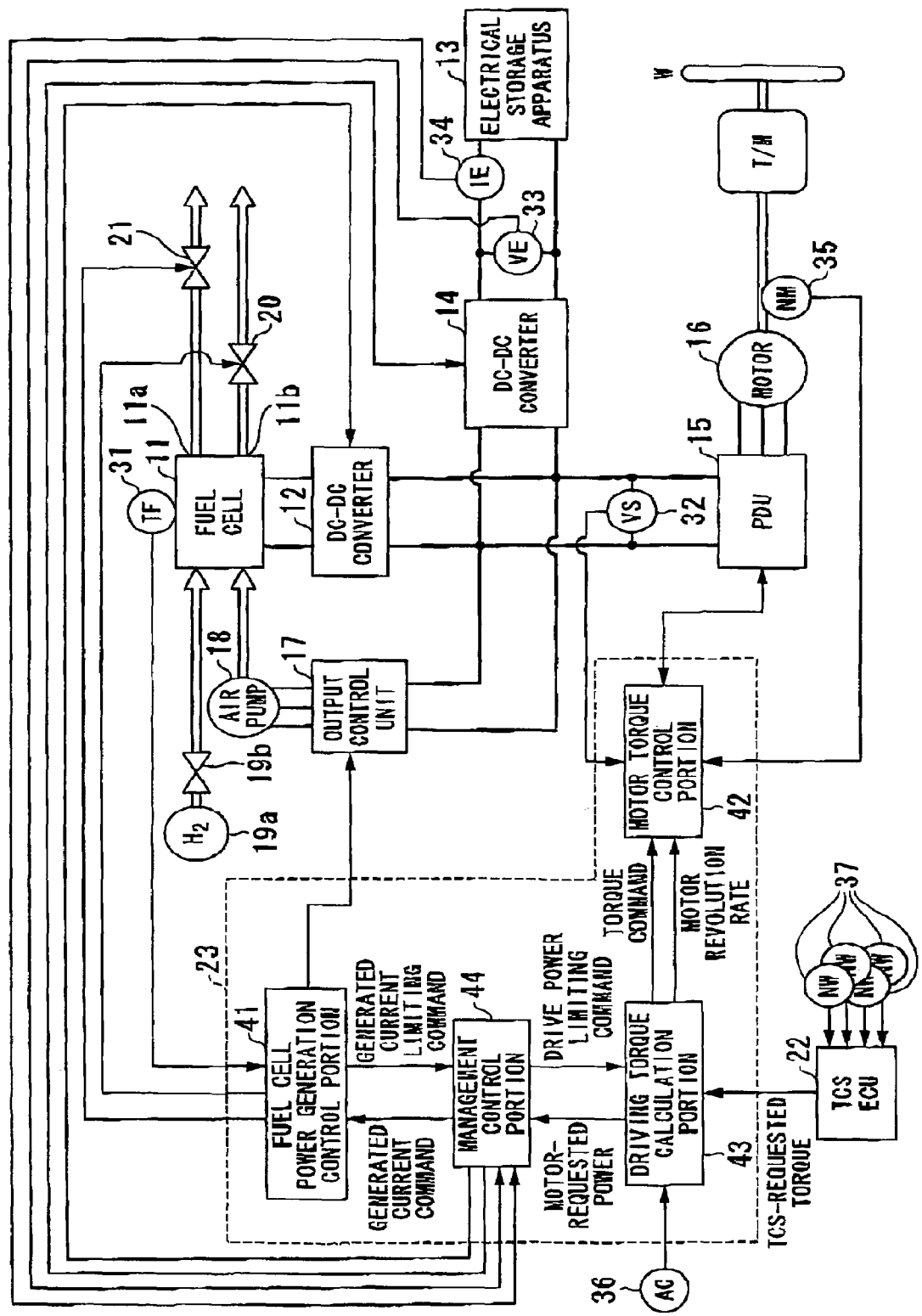
FIG. 1 is a block diagram of the control apparatus for the fuel cell vehicle according to the first embodiment of the present invention.

A control apparatus 10 for the fuel cell vehicle of the present embodiment is, as shown in FIG. 1, constituted by a fuel cell 11, a first DC-DC converter 12, an electrical storage apparatus 13, a second DC-DC converter 14, a power drive unit (PDU) 15, a motor 16, an output control unit 17, an air pump 18, a hydrogen tank 19 and a hydrogen supply value 19b, a back pressure valve 20, a purge valve 21, a traction control system electronic control unit (TCSECU) 22, a control apparatus 23; a fuel cell temperate sensor 31; a system voltage sensor 32, a terminal voltage sensor 33, a current sensor 34, a motor revolution rate sensor 35, an accelerator opening degree sensor 36, and wheel speed sensors 37.

The control apparatus 23 is constituted by, for example, a fuel cell power generation control portion 41, a motor torque control portion 42, a driving torque calculation portion 43, and a management control portion 44.

The fuel cell 11 includes a plurality of unit cells each held between a pair of separators, with each cell being an electrolyte-electrode assembly comprising a solid polymer electrolyte membrane consisting of a positive ion exchange film and the like sandwiched between a fuel terminal (anode) consisting of an anode catalyst and a gas diffusion layer and an oxygen terminal (cathode) consisting of a cathode catalyst and a gas diffusion layer. The stack of unit cells is sandwiched on both sides in the stack direction by a pair of end plates.

Air, which is an oxidizing gas (a reactant gas) including oxygen, is supplied from the air pump 18 such as an air compressor or the like to the cathode of the fuel cell 11. Fuel gas (a reactant gas) that contains hydrogen is supplied from the high pressure hydrogen tank 19a via the hydrogen supply valve 19b to the anode of the fuel cell 11.

Hydrogen that is ionized through a catalytic reaction on the anode catalyst of the anode permeates to the cathode via the suitably humidified solid polymer electrolyte membrane. Electrons generated as a result of this movement are extracted to an external circuit and used as direct cult electrical energy. The hydrogen ions, electrons, and oxygen combine at the cathode at this time to form water.

The hydrogen supply valve 19b is a pneumatic-type proportional pressure control valve. With the pressure of the air supplied from the air pump 18 serving as a signal pressure, the pressure of the hydrogen at the outlet of the hydrogen supply valve 19b after passing through the hydrogen supply valve 19b is set to be within a predetermined range in response to the signal pressure.

The air pump 18, which includes an air compressor or the like, takes in air from outside the vehicle, for example, compresses it, and supplies this air as reactant gas to the cathode of the fuel cell 11.

The revolution rate of a motor (not illustrated) that drives the air pump 18 is controlled by the output control unit 17 equipped with a pulse-width modulated (PWM) inverter based on a control command input from the fuel cell power generation control portion 41 of the control apparatus 23.

Exhaust gas discharged from the hydrogen exhaust port 11a of the fuel cell 11 is fed to a dilution box (not illustrated) via a discharge control vale (not illustrated) whose opening and closing is controlled by the fuel cell power generation control portion 41. The hydrogen concentration of the exhaust gas is reduced to a specified concentration or less by the dilution box, and then discharged to outside (the atmosphere) via the purge valve 21.

A portion of the unreacted exhaust gas discharged from a hydrogen exhaust port 11a of the fuel cell 11 is fed to a circulation flow passage equipped with, for example, a circulating pump (not illustrated) and an ejector (not illustrated), or the like. There, the hydrogen supplied from the hydrogen tank 19a is mixed with the exhaust gas discharged from the fuel cell 11 to then be supplied again to the fuel cell 11.

The unreacted exhaust gas discharged from an air exhaust port 11b of the fuel cell 11 is discharged to outside (the atmosphere) via the back pressure valve 20, whose valve opening is controlled by the fuel cell power generation control portion 41 of the control apparatus 23.

The first DC-DC converter 12 is equipped with, for example, a chopper-type power conversion circuit. It controls the current value of the output current extracted from the fuel cell 11 by the chopping operation of the chopper-type power conversion circuit, that is, the ON/OFF operation of switching elements provided in the chopper-type power conversion circuit. This switching operation is controlled in accordance with the duty of the control pulse input from the management control portion 44 of the control apparatus 23, i.e., the ON/OFF ratio.

For example, when current extraction from the fuel cell 1 is prohibited, the duty of the control pulse input from the management control portion 44 is set to 0%, the switching element provided in the chopper-type power conversion circuit is fixed to an OFF state and the fuel cell 11 and the PDU 15 are electrically isolated. On the other hand, when the duty of die control pulse is set to 100%, go that the switching element is fixed to the ON state, the fuel cell 11 and the PDU 15 become practically directly coupled, so that the output voltage of the fuel cell 11 and the input voltage of the PDU 15 are the same value.

Also, when the duty of the control pulse is set to a suitable value between 0% and 100%, the first DC-DC converter 12 appropriately restricts the output current of the fuel cell 1, which serves as a primary side currents in accordance with the duty of the control pulse, and outputs the current resulting from the restriction as a secondary side current.

The electrical storage apparatus 13 is a capacitor or a battery etc. which includes an electric double layer capacitor, an electrolytic capacitor, or the like, and is connected in parallel to the first DC-DC converter 12 and the PDU 15 through a bidirectional second DC-DC converter 14.

The second DC-DC converter 14 steps down the system voltage VS related to the electrical generation of the fuel cell 11 or the regenerative operation of the motor 16 to be able to charge the electrical storage apparatus 13, and steps up the terminal voltage VE of the electrical storage apparatus 13. For this reason, the measurement signals output from the terminal voltage sensor 33 that measures the terminal voltage VE of the electrical storage apparatus 13 and the current sensor 34 that measures the charging current and the discharge current of the electrical storage apparatus 13 are input to the management control portion 44 of the control apparatus 23.

Thereby, the fuel cell 11 and the electrical storage apparatus 13 constituting the fill cell system are made to serve as the motor 16.

The PDU 15 is, for example, equipped with a PWM inverter with pulse width modulation, and controls the driving and regenerative operation of the motor 16 according to a control command output from the motor torque control portion 42 of the control apparatus 23. This PWM inverter is equipped with a bridge circuit in which a bridge connection is formed using a plurality of transistor switching elements. For example, when driving the motor 16, the direct current power output from the first DC-DC converter 12 and the second DC-DC converter 14 is converted to three-phase alternating current power based on the PWM signal input from the motor torque control portion 42, and supplied to the motor 16. On the other hand, during regenerative operation of the motor 16, the three-phase alternating current power output from the motor 16 is converted to direct current power and supplied to the electrical storage apparatus 13 via the second DC-DC converter 14 to charge the electrical storage apparatus 13.

The motor 16 is, for example, a permanent magnet-type three-phase AC synchronous motor that uses the permanent magnets as magnetic fields. It is drive controlled by the three-phase AC power supplied from the PDU 15, and when drive power is transmitted to the motor 16 side from the drive wheels W during deceleration of the vehicle, the motor 16 functions as a generator to produce so-called regenerative-braking force and thereby recover the kinetic energy of the vehicle as electrical energy.

The TCSECU 22 computes a s quantity related to the slippage state of the drive wheels W, for example the difference in the rotational speed of the drive wheels W and the coupled wheels (slip amount), based on the measurement signal output from a plurality of wheel speed sensors 37 that measure the rotational speed of each of the wheels of the vehicle (wheel speed NW). By referring to a specified TCS-requested torque map that is set in advance, for example a map that shows the correspondence between the slip amount and the torque required for ensuring a specified grip force of the drive wheels W to the road surface, the TCS-requested torque TT, which is a command value with respect to the torque output from the motor 16, is computed.

In the specified TCS-requested torque map, for example the TCS-requested torque TT is set to change to a declining tendency as the slip amount increases.

Also, for example, when the difference in the rotational speed of the drive wheels W and the coupled wheels (slip amount) is equal to or greater than a specified value, the TCSECU 22 outputs a flag value of the TCS operation flag showing whether or not traction control showing whether or not traction control is being executed (for example "1" for the execution state of traction control and "0" in the non-execution state), with traction control referring to control to reduce the drive power of the drive wheels W in accordance with the TCS-requested torque TT to restrict slippage of the drive wheels W caused by an excess driving force acting from the tires of the drive wheels W to the road surface.

The fuel cell power generation control portion 41 of the control apparatus 23 outputs a command value for the pressure and flow rate of the reactant gas supplied from the air pump 18 to the fuel cell 11 and a command value for the value opening degree of the back pressure valve 20 as power generation commands for the fuel cell 11, based on, for example, the generated current command input from the management control portion 44, as well as the running state of the vehicle, the concentration of hydrogen contained in the reactant gas supplied to the anode of the fuel cell 11, the concentration of hydrogen contained in the exhaust gas discharged from the anode of the fuel cell 11, the power generation state of the fuel cell 11 such as the inter-terminal voltages of the plurality of unit cells, the output current extracted from the fuel cell 11, and the internal temperature TF of the fuel cell 11.

The fuel cell power generation control portion 41, with respect to the generated current command input from the management control portion 44, computes an upper limit value of the generated power that can be generated by the fuel cell 11 based on each measurement value of the pressure and flow rate (actual flow rate and act pressure) of the reactant gas supplied to the fuel cell 11, and outputs a signal designating the limit for the output current taken from the fuel cell 11 in accordance with this upper limit value (generated current limiting command) to the management control portion 44.

The motor torque control portion 42 of the control apparatus 23 controls the power conversion operation of the PWM inverter provided in the PDU 15, For example, during driving of the motor 16, it computes the drive-requested output required for outputting the torque corresponding to the torque command from the motor 16, based on the torque command input from the driving torque calculation portion 43, and in accordance with this drive-requested output, sots a switching command (i.e., a PWM signal) that includes pulses that turn ON/OFF the switching elements of the PWM inverter by PWM.

When the switching command is input from the motor torque control portion 42 of the control apparatus 23 to the PDU 15, the current to the stator windings (not illustrated) of each phase of the motor 16 is successively commutated. Thereby, the magnitude (i.e., amplitude) and phase of the U-phase, V-phase, and W-phase impressed voltages are controlled, and the phase current of the U-phase, V-phase, and W-phase according to the torque command is impressed to each phase of the motor 16.

For this reason, the measurement signal output from the system voltage sensor 32 that measures the system voltage VS that serves as the input voltage for the PDU 15, and the measurement signal that is output from the motor revolution rate sensor 35 that measures the revolution rate NM of the motor 16 are input to the motor torque control portion 42 of the control apparatus 23.

The motor torque control portion 42 outputs the measurement signal of the revolution rate NM of the motor 16 input from the motor revolution rate sensor 35 to the driving torque calculation portion 43.

Figure 2:
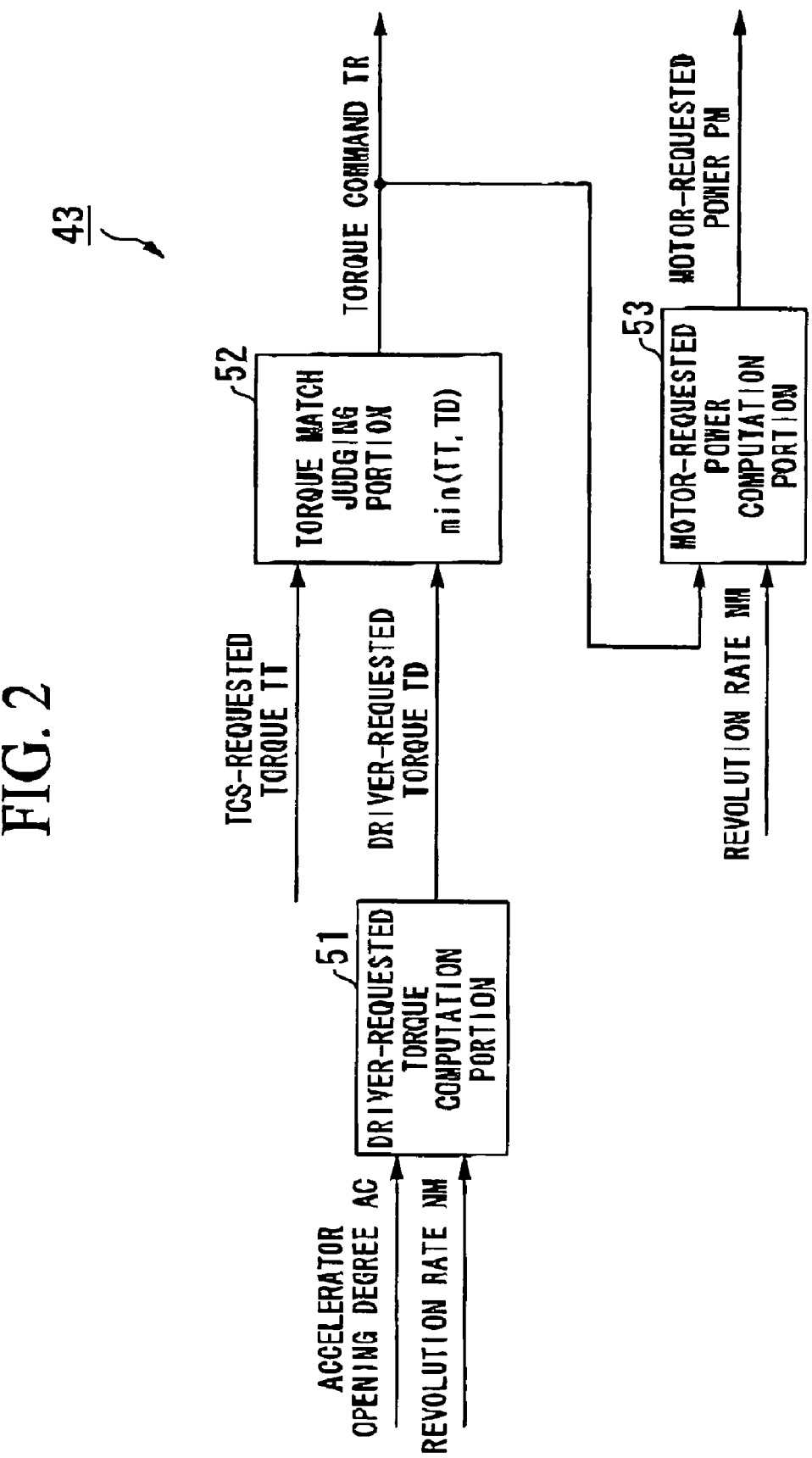
FIG. 2 is a block diagram of the driving torque calculation portion shown in FIG. 1.

The driving torque calculation portion 43 of the control apparatus 23 is, as shown for example in FIG. 2, constituted by a driver-requested torque computation portion 51, a torque match judging portion 52, and a motor-requested power computation portion 53.

The driver-requested torque computation portion 51 computes the driver-requested torque TD as a command value for the torque to be output from the motor 16, based on the measurement signal output from the accelerator opening degree sensor 36 that measures an accelerator opening degree AC according to the accelerator manipulated variable of the driver and the measurement signal output from the motor revolution rate sensor 35, referring to a driver-requested torque map etc. that indicates a specified correspondence between, for example, the accelerator opening degree AC, the revolution rate NM, and the driver-requested torque TD.

The torque match judging portion 52 selects the smaller of the TCS-requested torque TT or the driver-requested torque TD based on the TCS-requested torque TT input from the TCSECU 22 and the driver-requested torque TD input from the driver-requested torque computation portion 51, and sets it as a torque command TR that is a command value for the torque output from the motor 16.

The motor-requested power computation 53 computes a motor-requested power PM that indicates the power consumption of the motor 16 based on the revolution rate NM output from the motor revolution rate sensor 35, the torque command TR output from the torque match judging portion 52, and a drive power limiting command that is input from the management control portion 44.

The management control portion 44 of the control apparatus 23, based on the motor-requested power PM that is input from the driving torque calculation portion 43 and the drive power limiting command according to the upper limit of the generated power that can be generated by the fuel cell 11 input from the fuel cell power generation control portion 41, outputs a control pulse that controls the power conversion operation of the first DC-DC converter 12 to control the current value of the output current taken from the fuel cell 11, and outputs a control pulse that controls the power conversion operation of the second DC-DC converter 14 to control the charging and discharge of the electrical storage apparatus 13.

The management control portion 44 outputs to the fuel cell power generation control portion 41 a generated current command that indicates the generated current of the fuel cell 11 based on, for example, the motor-requested power PM that is input from the driving torque calculation portion 43, the auxiliary component-requested power corresponding to the power consumed by the auxiliary components, which consist of various electrical loads mounted on the vehicle, and the electrical power that can be discharged from the electrical storage apparatus 13.

The management control portion 44 outputs to the driving torque calculation portion 43 a drive power limiting command as a signal indicating the limit on power consumption of the motor 16, based on the generated current limiting command input from the fuel cell power generation control portion 41 and the auxiliary component-requested power.

For this reason, the measurement signals output from for example the terminal voltage sensor 33 that measures the terminal voltage VE of the electrical storage apparatus 13 and the current sensor 34 that measures the charging current and the discharge current of the electrical storage apparatus 13 are input to the management control portion 44 of the control apparatus 23.

The control apparatus 10 of the fuel cell vehicle according to the first embodiment of the present invention has the above-described constitution. Next, the operation of the control apparatus 10 of the fuel cell vehicle, that is, the method of controlling the fuel cell vehicle, shall be described while referring to the attached drawings.

First, in step S01 of the flowchart shown in FIG. 3, the motor-requested power PM that indicates the power consumption of the motor 16 is computed by the motor-requested power computation process to be described later.

Next, in step S02, the generated current command that indicates the generated current of the fuel cell 11 is computed based on the motor-requested power PM, the auxiliary component-requested power corresponding to the power consumed by the auxiliary components consisting of various electrical loads mounted on the vehicle, and the electrical power that can be discharged from the electrical storage apparatus 13.

Next, in step S03, the drive power limiting command that indicates the limit on the power consumption of the motor 16 is computed based on the generated current limiting command that indicates the limit on the output current taken from the fuel cell 11 in accordance with the upper limit value of the generated power that can be generated by the fuel cell 11 by a drive power limiting command computation process, and the series of processes ends.

Below, the motor-requested power computation process is of step S01 above is described.

Figure 4:
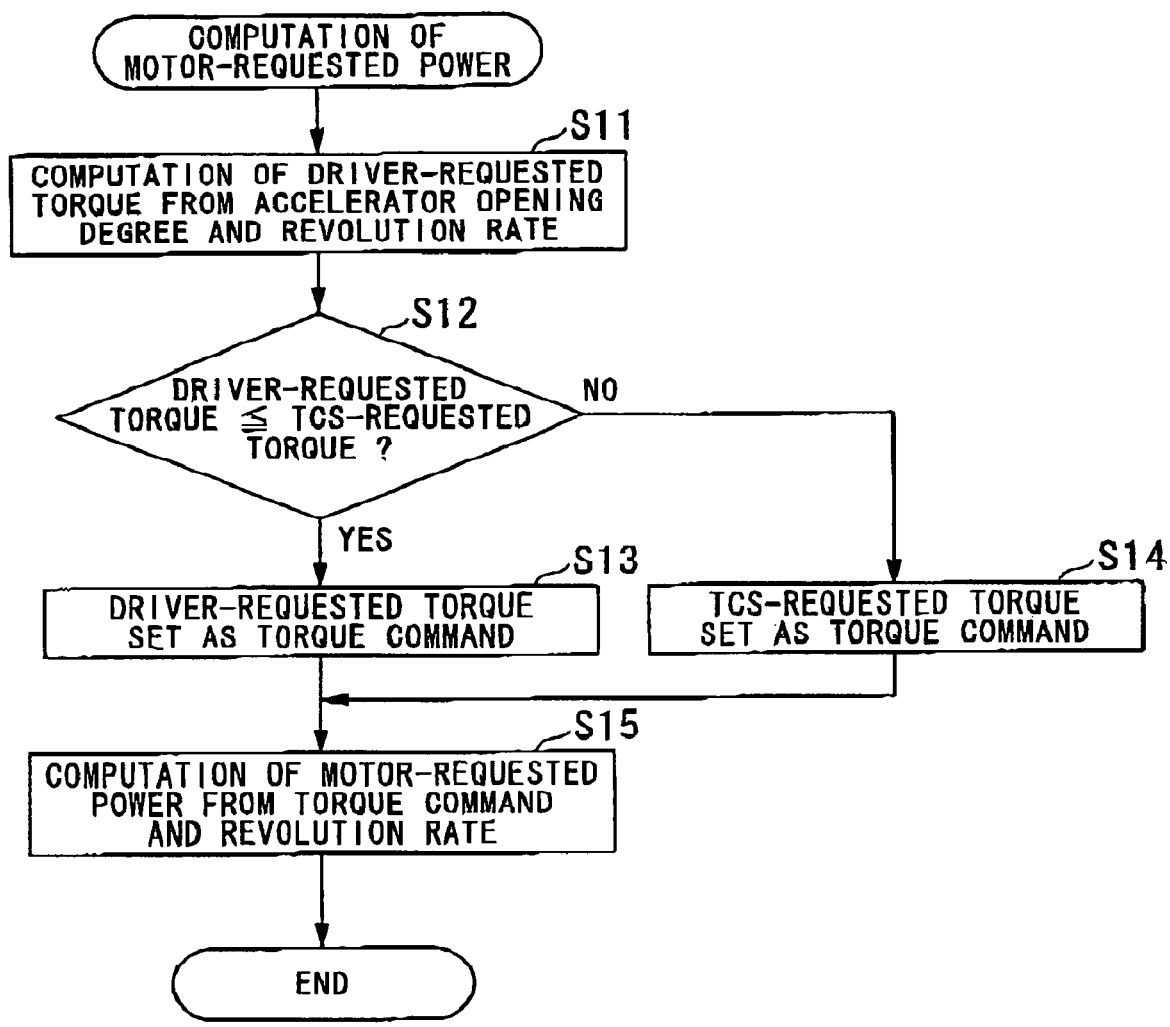
FIG. 4 is a flowchart showing the process of calculating the electrical power required by the motor shown in FIG. 3 in the first embodiment of the present invention.

First, in step S11 shown for example in FIG. 4, based on the accelerator opening degree AC and the revolution rate NM of the motor 16, referring for example to the driver-requested torque map etc. that is set in advance, the driver-requested torque TD is computed as a command value for the torque output from the motor 16.

Next, in step S12, it is determined whether or not the computed driver-requested torque TD is less than or equal to the TCS-requested torque TT output from the TCSECU 22.

If the determination result is "YES", the processing proceeds to step S13, wherein the driver-requested torque TD is set as the torque command TR, which a command value for the torque output from the motor 16, and the processing proceeds to step S15 to be hereinafter described.

If this determination result is "NO", the processing proceeds to step S14, wherein the TCS-requested torque TT is set as the torque command TR, and then the processing proceeds to step S15.

In step S15, based on the set torque command TR and the revolution rate NM of the motor 16, the motor-requested power PM that indicates the power consumption of the motor 16 is computed, and the series of processes terminates.

Figure 5:
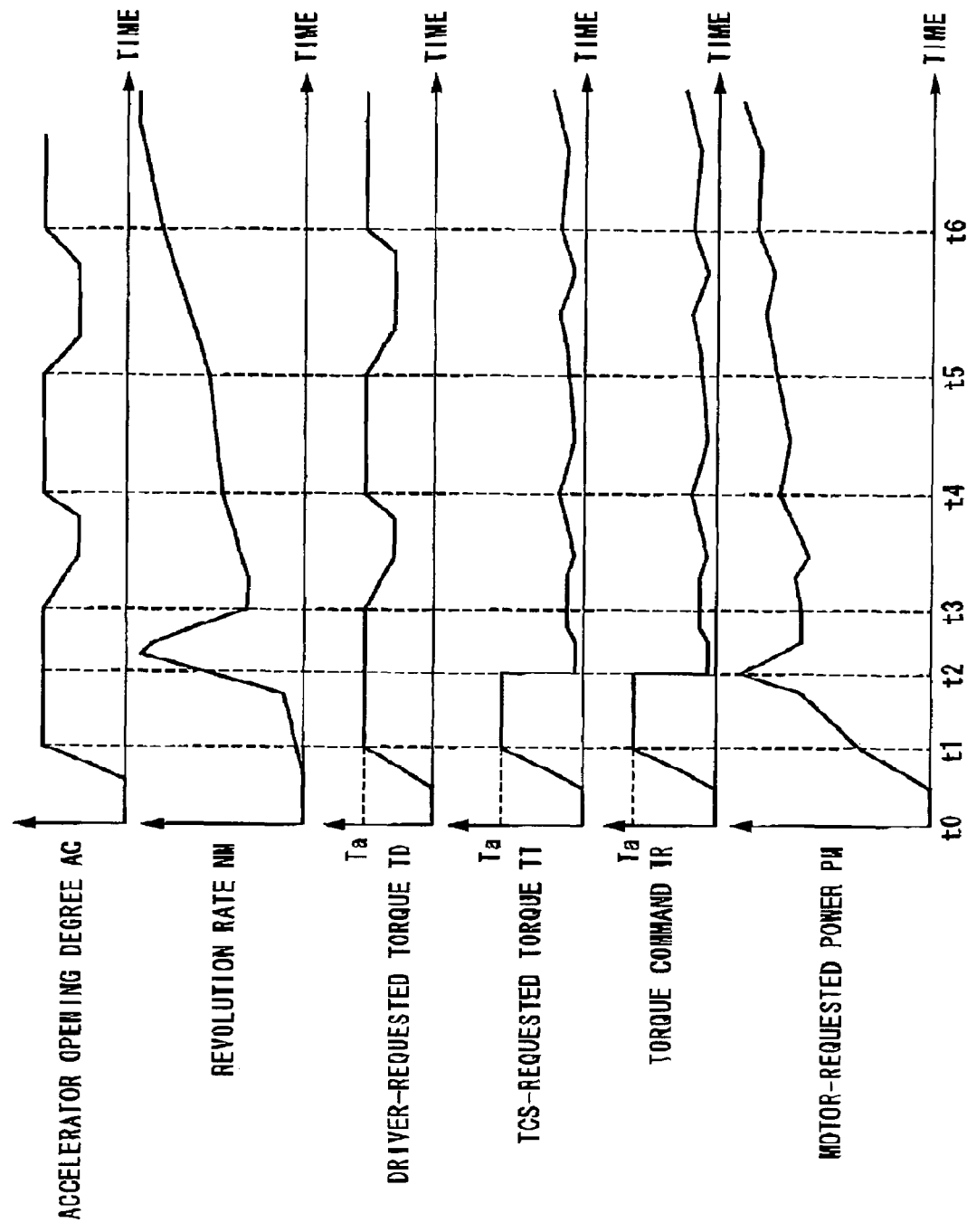
FIG. 5 is a graph showing an example of changes over time of the accelerator opening degree, the revolution rate of the motor, the torque required by the driver, the torque required by the traction control system (TCS), the torque command, and the electrical power required by the motor.

As shown for example in FIG. 5, in the state of the motor-requested power PM changing in accordance with the revolution rate NM of the motor 16 and the torque command TR, during the period from time t0 to time t2 in which the driver-requested torque TD and the TCS-requested torque TT are equivalent values, the driver-requested torque TD or the TCS-requested torque TT is set as the torque command TR.

From time t2 onward during which when the TCS-requested torque TT is less than the driver-requested torque TD, the TCS-requested torque TT is set as the torque command TR.

As stated above, according to the control apparatus 10 for the fuel cell vehicle and the control method for the fuel cell vehicle according to the first embodiment of the present invention, accompanying the start of execution of traction control to suppress slippage of the drive wheels W caused by excessive drive being applied from the tires to the road surface, the power consumption of the motor 16 (i.e., the motor-requested power PM) is controlled by the driving torque calculation portion 43 in advance of a change in the supply state of reactant gases supplied to the fuel cell 11 by, for example, control of the fuel cell power generation control portion 41. Thereby, execution of control of the power consumption of the motor 16, which has a relatively short response delay, can be promptly started independently of control of the supply state of reactant gases, which have a relatively long response delay, and the output of the motor 16 can be directly controlled with adequate accuracy (that is, irrespective of the supply state of the reactant gases to the fuel cell 11), so the grip form can be appropriately increased immediately even, for example, when slippage of the wheels W has occurred.

Moreover, in the state of the driving force of the motor being controlled by the traction control unit, because the supply state of the reactant gases is controlled in accordance with the motor-requested power PM, the generated power of the fuel cell 11 is prevented from becoming excessive or increasing unnecessarily, and a drop in the energy efficiency of the fuel cell vehicle as a whole due to losses when charging the surplus portion of generated power of the fuel cell 11 to the electrical storage apparatus can be prevented.

The torque command TR for controlling the grip state of the drive wheels W is set so as to have the same value as the smaller of the TCS-requested torque TT or the driver-requested torque TD. Therefore, during execution of traction control, for example, even in the state of the driver-requested torque TD being greater than the TCS-requested torque TT, the driving force of the motor 16 is suitably reduced so that the grip force of the drive wheels W can be suitably increased.

Because the motor-requested power PM for controlling the supply state of the reactant gases is computed based on the torque command TR and revolution rate NM of the motor 16, the generated power of the fuel cell 11 can be appropriately set in accordance with the operating state of the motor 16.

Figure 6:
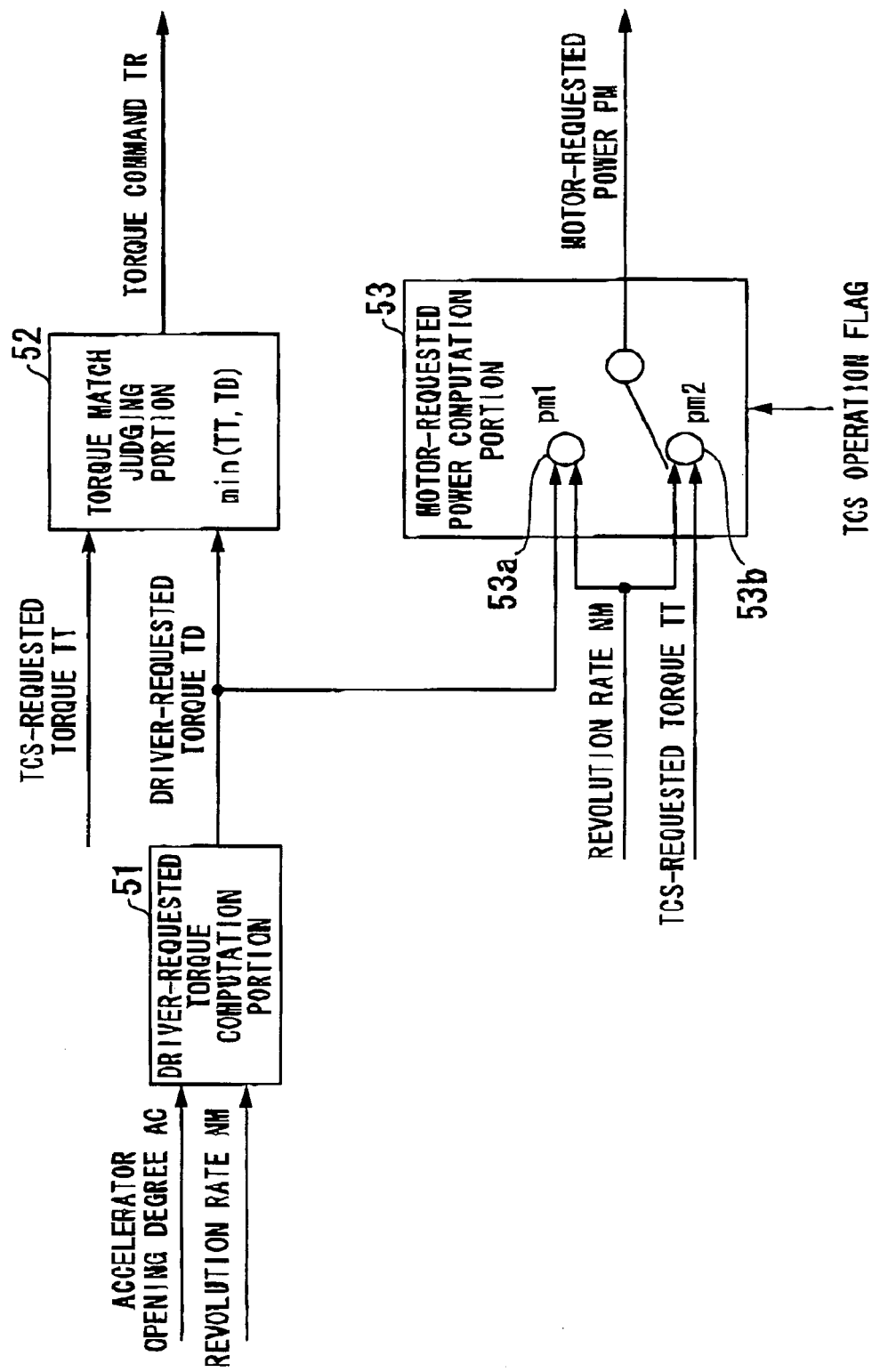
FIG. 6 is a block diagram of the driving torque calculation portion according to a modification example of the first embodiment of the present invention.

In the control apparatus 10 for the fuel cell vehicle and the control method for the fuel cell vehicle according to the first embodiment of the present invention described above, the motor-requested power PM was computed from the torque command TR set to the smaller of the TCS-requested torque TT or the driver-requested torque TD and the revolution rate NM of the motor 16. However, without being limited thereto, the motor-requested power PM may be computed from either one of the TCS-requested torque TT or the driver-requested torque TD selected in accordance with the flag value of the TCS operation flag, that is, with the execution state of traction control, and the revolution rate NM of the motor 16, as in the control apparatus 10 for the fuel cell vehicle and the control method for the fuel cell vehicle according to the modification example of the first embodiment of the present invention shown, for example, in FIGS. 6 to 8.

Figure 3:
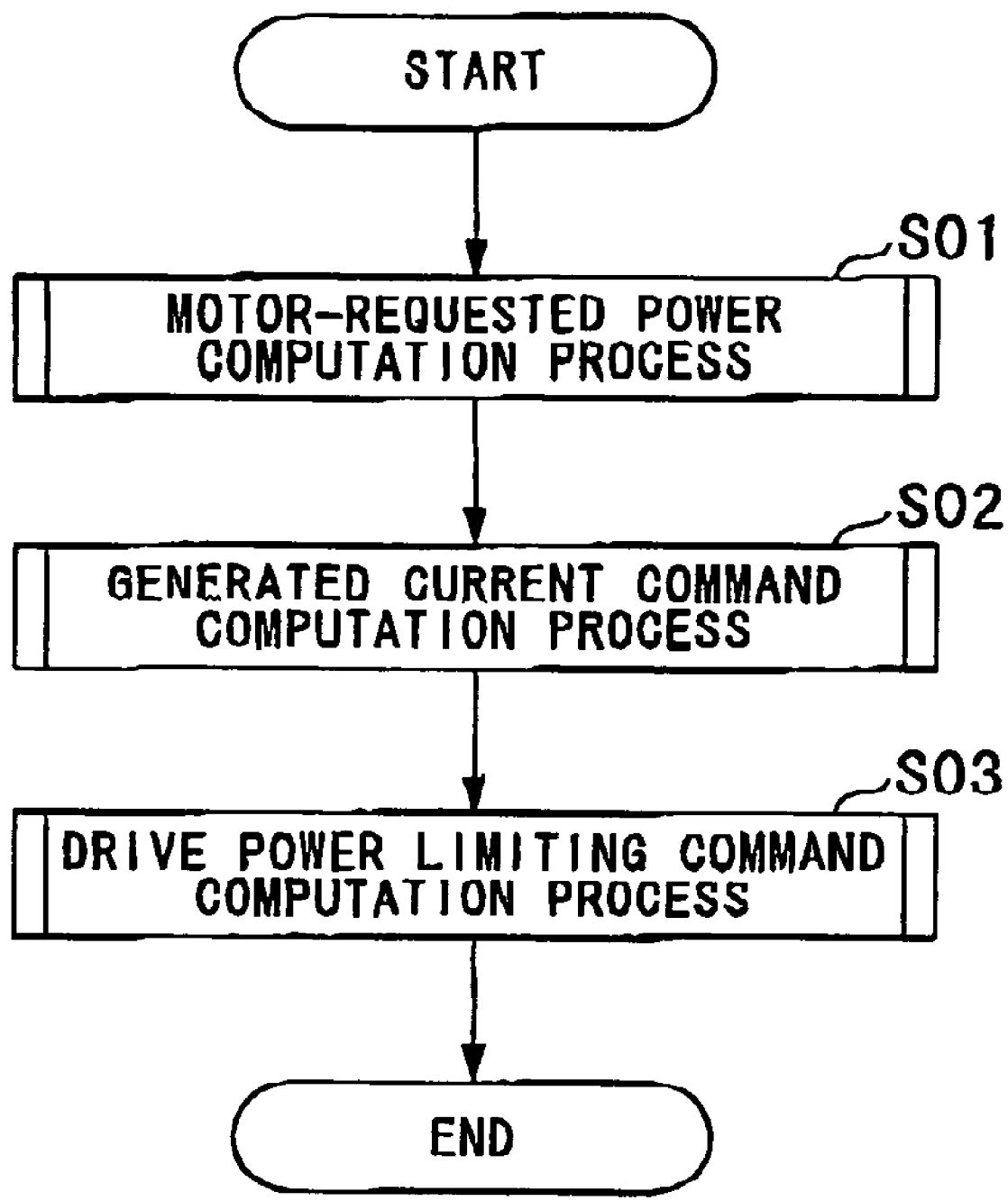
FIG. 3 is a flowchart showing the operation of the fuel cell vehicle control apparatus according to the first embodiment of the present invention.

In the modification example of the first embodiment, the main points of difference with the above-described control apparatus 10 for the fuel cell vehicle and the control method for the fuel cell vehicle according to the first embodiment described above are the motor-requested power computation portion 53 of the driving torque calculation portion 43 and the motor-requested power computation process of step S01 shown in FIG. 3.

In the modification example of the first embodiment, the motor-requested power computation portion 53 is equipped with a first requested power computation portion 53a that computes a first requested power pm1 based on the revolution rate NM output from the motor revolution rate sensor 35 and the driver-requested torque TD input from the driver-requested torque computation portion 51, and a second requested power computation portion 53b that computes a second requested power pm2 based on the revolution-rate NM output from the motor revolution rate sensor 35 and the TCS-requested torque TT input from the TCSECU 22. In accordance with the flag value of the TCS operation flag input from the TCSECU 22, in the case of a non-execution state of traction control with a flag value of "0", the first requested power pm1 calculated by the first requested power computation portion 53a is set as the motor-requested power PM, and in the case of an execution state of traction control with a flag value of "1", the second requested power pm2 calculated by the second requested power computation portion 53b is set as the motor-requested power PM.

The operation of the control apparatus 10 for the fuel cell vehicle, that is, the control method for the fuel cell vehicle, according to the modification example of the first embodiment, particularly the above-mentioned motor-requested power computation process of step S01 shown in FIG. 3, is explained below with reference to the accompanying drawings.

Figure 7:
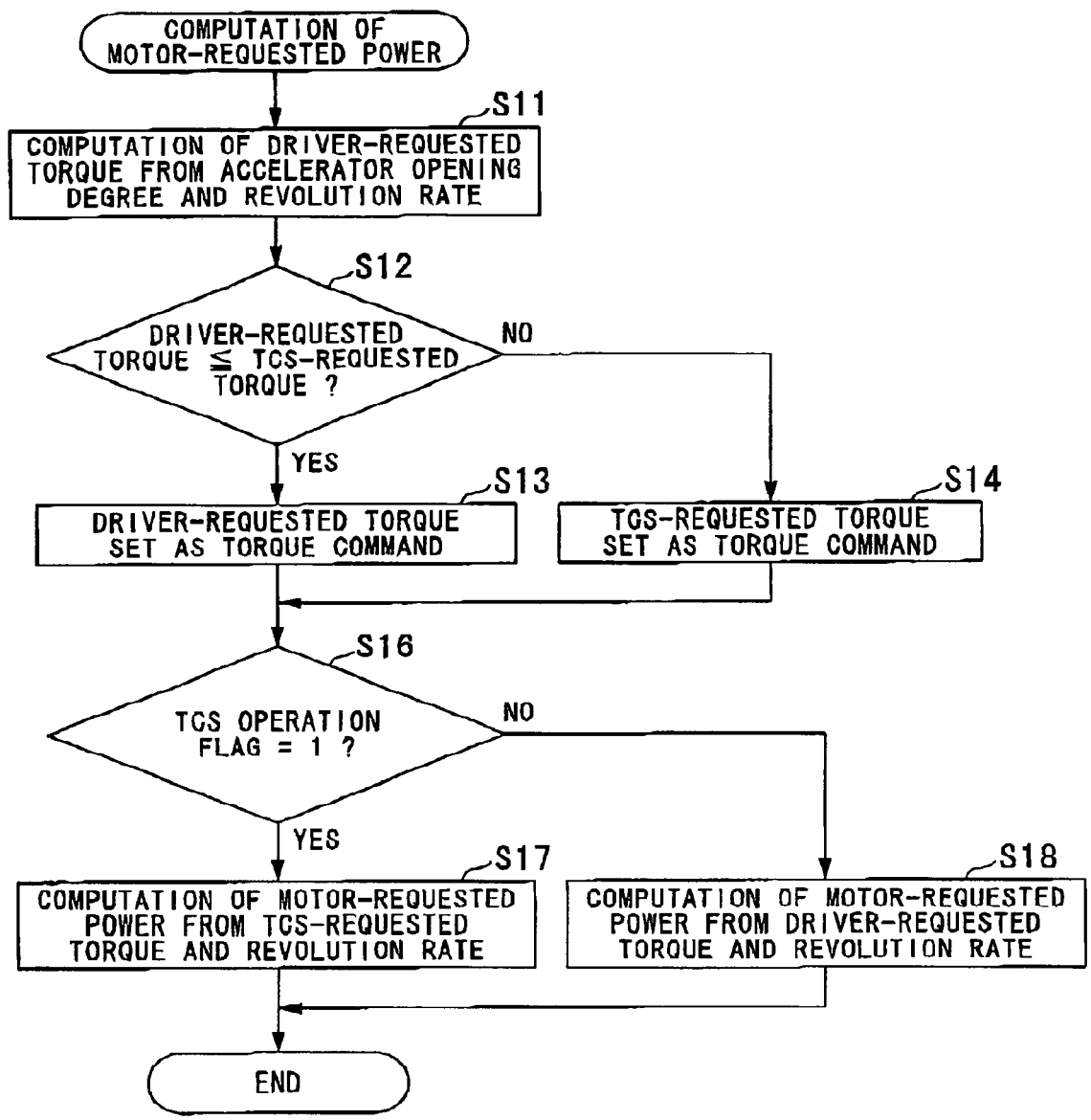
FIG. 7 is a flowchart showing the process of calculating the electrical power required by the motor according to a modification example of the first embodiment of the present invention.

First, in step S11 shown for example in FIG. 7, based on the accelerator opening degree AC and the revolution rate NM of the motor 16, referring for example to the driver-requested torque map etc. that is set in advance, the driver-requested torque TD is computed as a command value for the torque output from the motor 16.

Next, in step S12, it is determined whether or not the computed driver-requested torque TD is less than or equal to the TCS-requested torque TT output from the TCSECU 22.

If the determination result is "YES", the processing proceeds to step S13, wherein the driver-rested torque TD is set as the torque command TR which a command value for the torque output from the motor 16, and the processing proceeds to step S16 to be hereinafter described.

If this determination result is "NO", the processing proceeds to step S14, wherein the TCS-requested torque TT is set as the torque command TR, and then the processing proceeds to step S16.

Next, in step S16, it is determined whether or not the flag value of the TCS operation flag is "1".

If the determination result is "YES", the processing proceeds to step S17, wherein the motor-requested power PM that indicates the power consumption of the motor 16 is computed based on the TCS-requested torque TT and the revolution rate NM of the motor 16, and the series of processes terminates.

On the other hand if this determination result is "NO", the processing proceeds to step S18, wherein the motor-requested power PM is computed based on the driver-requested torque TD and the revolution rate NM of the motor 16, and the series of processes terminates.

Figure 8:
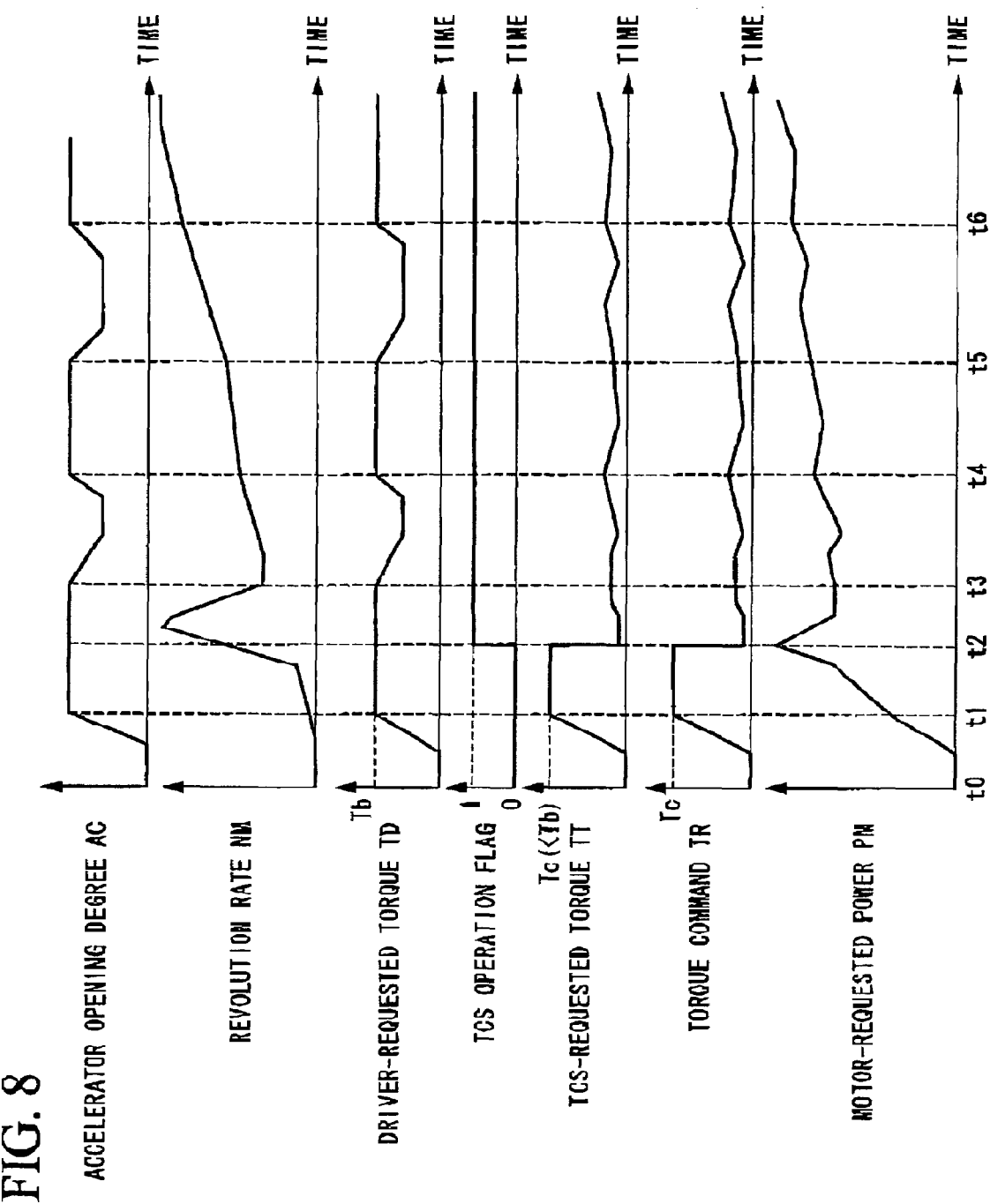
FIG. 8 is a graph showing an example of changes over time of the accelerator opening degree, the revolution rate of the motor, the torque required by the driver, the torque required by the TCS, the torque command, and the electrical power required by the motor according to a modification example of the first embodiment of the present invention.
Figure 9:
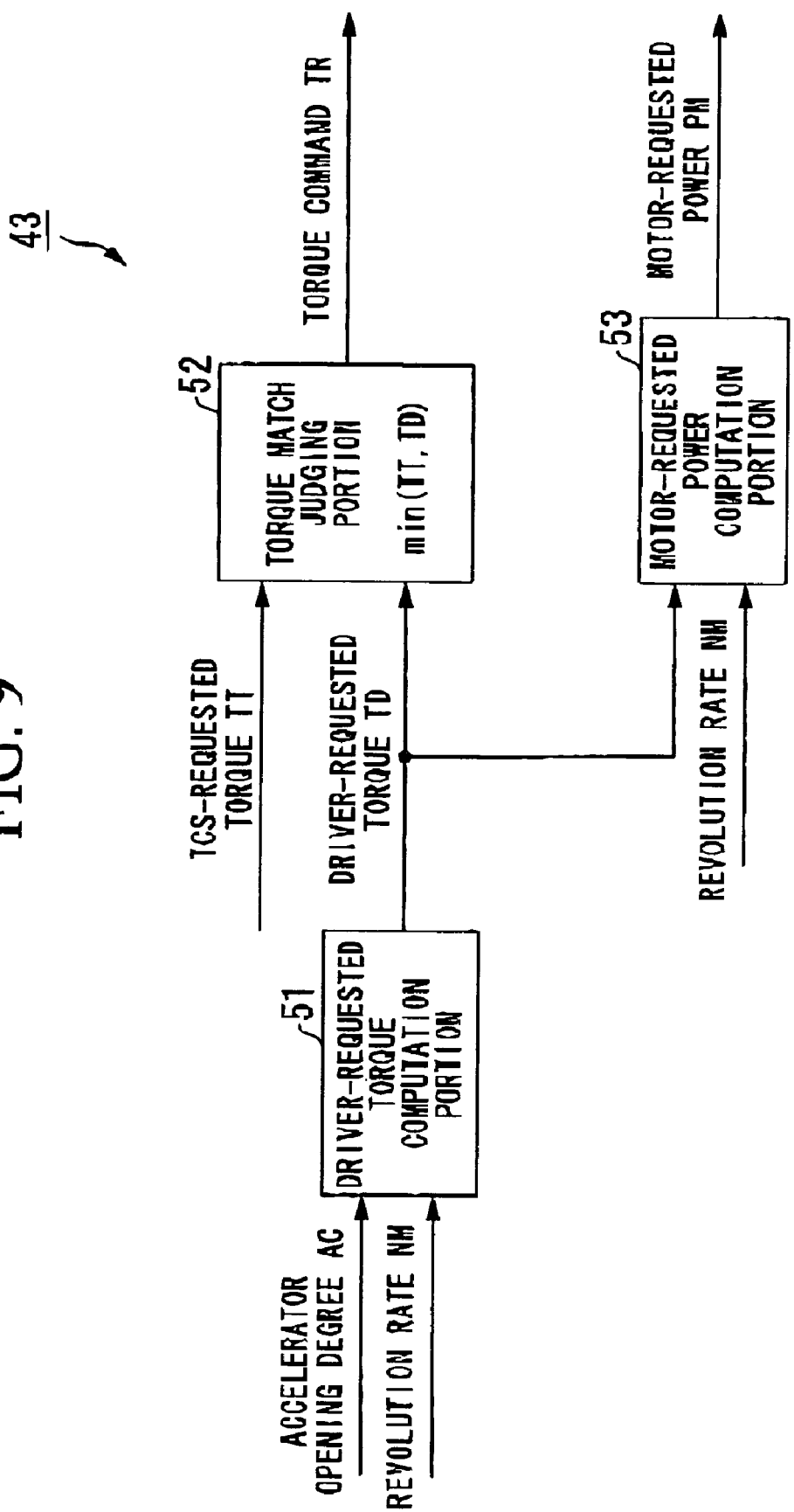
FIG. 9 is a block diagram of the driving torque calculation portion according to the second embodiment of the present invention.

As shown in for example FIG. 8, first, with respect to the torque command TR of the motor 16 in which the smaller of the TCS-requested torque TT or the driver-requested torque TD is set, during the period from time t0 to time t2 during which the TCS-requested torque TT (=Tc) is less than the driver-requested torque TD (=Tb>Tc), the TCS-requested torque TT is set as the torque command TR. Then, when the TCS-requested torque TT is less than the driver-requested torque TD from the time t2 onward, the TCS-requested torque TT is set as the torque command TR.

Also, with respect to the motor-requested power PM, during the period from time t0 to time t2 during which the flag value of the TCS operation flag is "0", the motor-requested power PM is computed based on the driver-requested torque TD and the revolution rate NM of the motor 16. And from the time t2 onward when the flag value of the TCS operation flag is "1", the motor-requested power PM is computed based on the TCS-requested torque TT and the revolution rate NM of the motor 16.

As described above, according to the control apparatus 10 for the fuel cell vehicle and the control method for the fuel cell vehicle according to the modification example of the first embodiment of the present invention, during execution of traction control, regardless of the driver-requested torque TD, the motor-requested power PM is set in accordance with the TCS-requested torque TT and the revolution rate NM of the motor 16. On the other hand, when traction control is not being executed, the motor-requested torque PM is set in accordance with the driver-requested torque TD and the revolution rate NM of the motor 16. Thereby, the motor-requested torque PM for controlling the supply state of the reactant gases can be set according to whether traction control is executed, and the power generation of the fuel cell 11 can be appropriately set in accordance with whether traction control is executed.

A control apparatus for a fuel cell vehicle and a control method for a fuel cell vehicle according to the second embodiment of the present invention shall be described below with reference to the attached drawings.

In the control apparatus 10 for the fuel cell vehicle and the control method for the fuel cell vehicle according to the first embodiment of the present invention described above, during execution of traction control the supply state of the reactant gases is controlled in accordance with the power consumption of the motor 16 (for example, the motor-requested power PM). However, in the control apparatus for the fuel cell vehicle and the control method for the fuel cell vehicle according to the second embodiment of the present invention described below, during execution of traction control the supply state of the reactant gases is controlled irrespective of the drive power of the motor 16.

In the control apparatus 10 for the fuel cell vehicle and the control method for the fuel cell vehicle according to the second embodiment, the main points of difference with the above-described control apparatus 10 for the fuel cell vehicle and the control method for the fuel cell vehicle according to the first embodiment described above are the motor-requested power computation portion 53 of the driving torque calculation portion 43 and the motor-requested power computation process of step S01 shown in FIG. 3.

In the second embodiment, the motor-requested power computation portion 53 computes the motor-requested power PM that indicates the power consumption of the motor 16 based on the revolution rate NM output from the motor revolution rate sensor 35 and the driver-requested torque TD input from the driver-requested torque computation portion 51.

The operation of the control apparatus 10 for the fuel cell vehicle, that is, the control method for the fuel cell vehicle, according to the modification example of the second embodiment particularly the above-mentioned motor-requested power computation process of step S01 shown in FIG. 3, is explained below with reference to the accompanying drawings.

Figure 10:
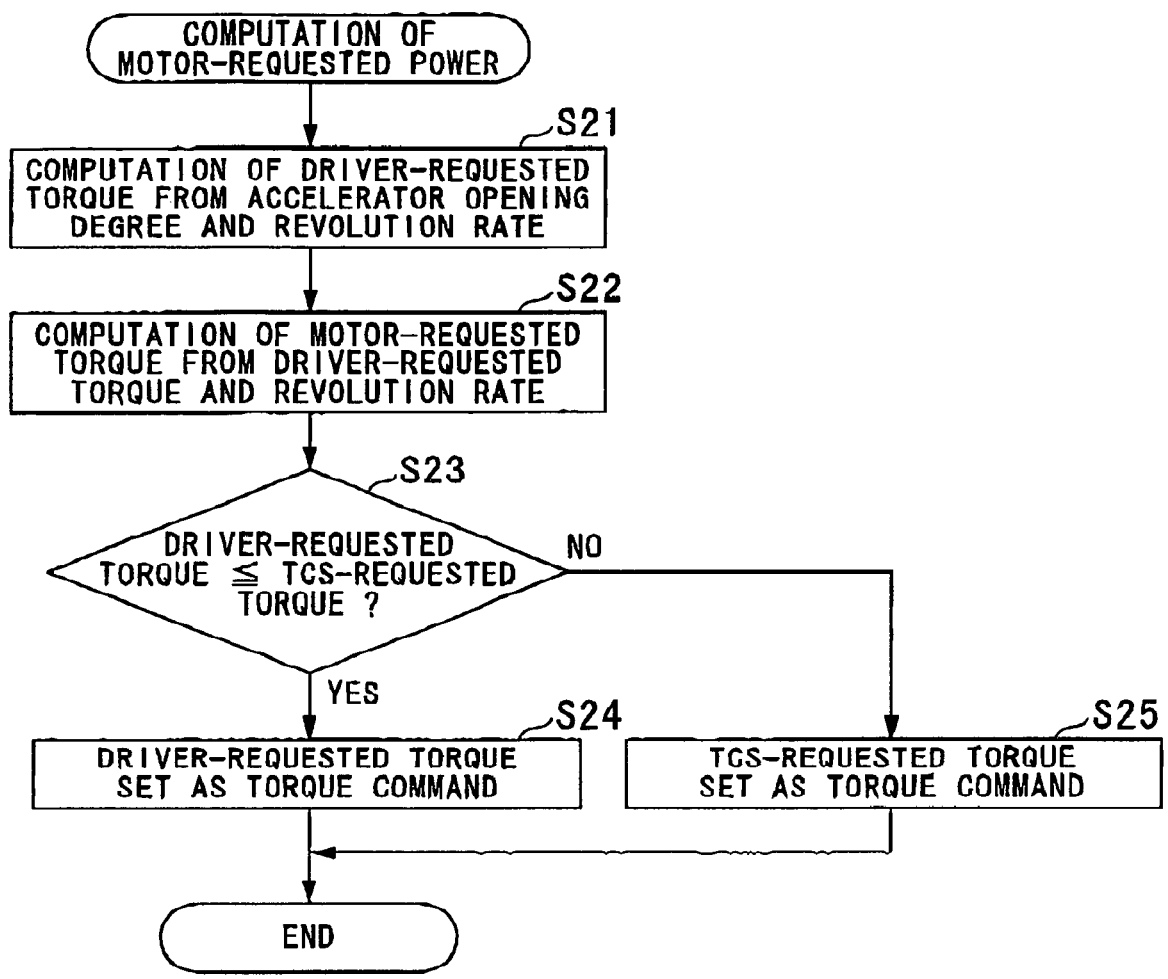
FIG. 10 is a flowchart showing the process of calculating the electrical power required by the motor according to the second embodiment of the present invention.

First, in step S21 shown for example in FIG. 10, based on the accelerator opening degree AC and the revolution rate NM of the motor 16, referring for example to the driver-requested torque map etc. that is set in advance, the driver-requested torque TD is computed as a command value for the torque output from the motor 16.

Next, in step S22, the motor-requested power PM is computed based on the driver-requested torque TD and the revolution rate NM of the motor 16.

Next, in step S23, it is determined whether or not the computed driver-requested torque TD is less than or equal to the TCS-requested torque TT output from the TCSECU 22.

If the determination result is "YES", the processing proceeds to step S24, wherein the driver-requested torque TD is set as the torque command TR, which a command value for the torque output from the motor 16, and the series of processes terminates.

If this determination result is "NO", the processing proceeds to step S25, wherein the TCS-requested torque TT is set as the torque command TR, and the series of processes terminates.

Figure 11:
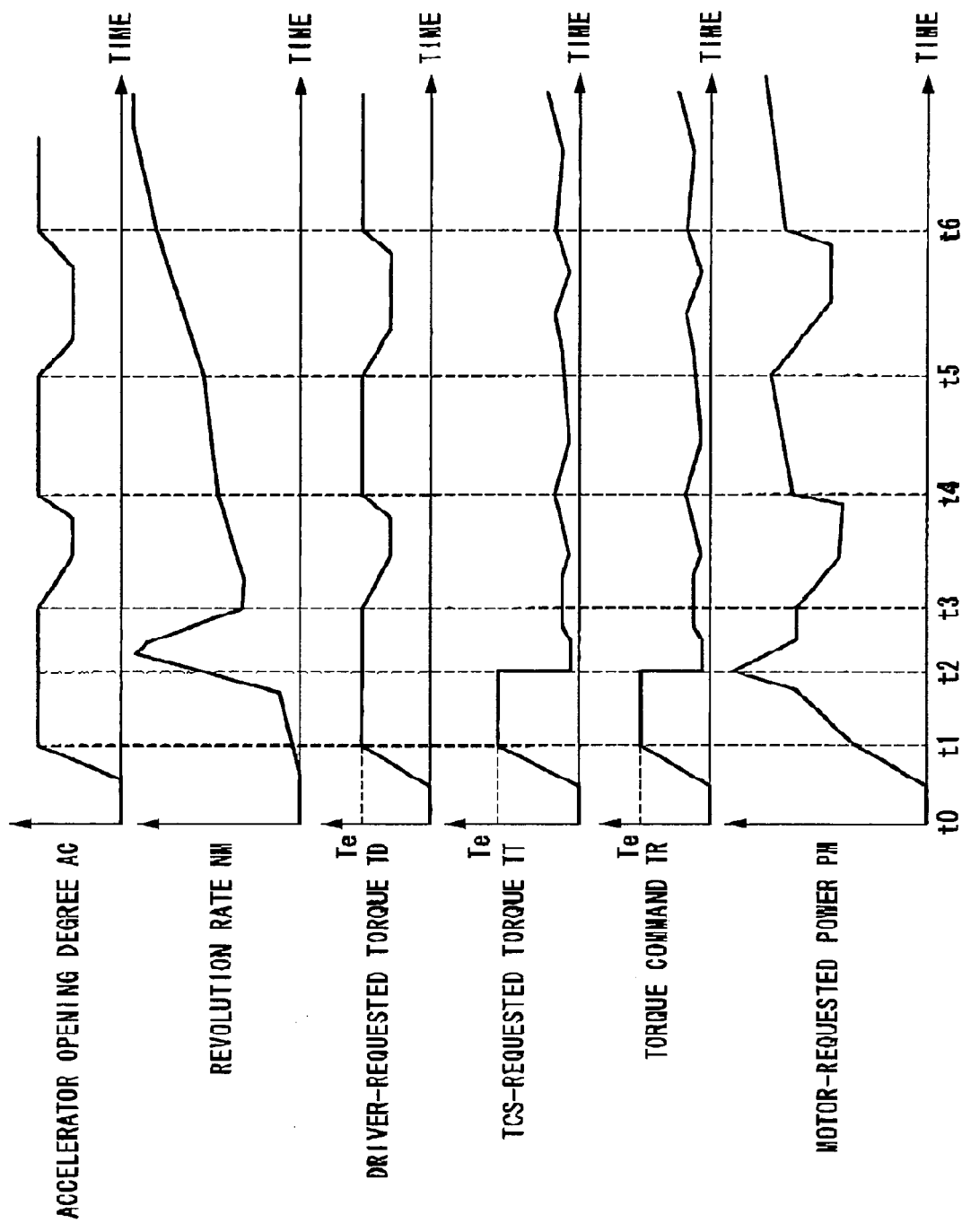
FIG. 11 is a graph showing an example of changes over time of the accelerator opening degree, the revolution rate of the motor, the torque required by the driver, the torque required by the TCS, the torque command, and the electrical power required by the motor according to the second embodiment of the present invention.

As shown in for example FIG. 11, first, with respect to the torque command TR of the motor 16 in which the smaller of the TCS-requested torque TT or the driver-requested torque TD is set, in the case of the driver-requested torque TD and the TCS-requested torque TT being equivalent values in the period from time t0 to time t2, the driver-requested torque TD or the TCS-requested torque TT is set as the torque command TR.

Also, with respect to the motor-requested power PM, irrespective of the torque command TR, that is, the TCS-requested torque TT, the motor-requested power PM is computed based on the driver-requested torque TD and the revolution rate NM of the motor 16.

As described above, according to the control apparatus 10 for the fuel cell vehicle and the control method for the fuel cell vehicle according to the second embodiment of the present invention, even in the state of the driving force of the motor 16 (that is, the torque command TR) being controlled by traction control, the supply state of the reactant gases is controlled independently of the driving force of the motor 16. Therefore, when, for example, traction control is being executed, the electrical output of the fuel cell 11 is prevented from decreasing in accordance with the driving force of the motor 16 being restricted. For this reason, even, for example, while the restriction on the driving force of the motor 16 is released following the completion of execution of the traction control and the driving force of the motor 16 abruptly increases as a result of the driving intention of the driver being reflected in the driving force of the motor 16, the power consumption of the motor 16 at this point can be covered by the electrical output of the fuel cell 11, and a shortage in the supply of reactant gases to the fuel cell 11 due to the power consumption of the motor 16 exceeding the electrical output of the fuel cell 11 can be prevented during the period until the electrical output of the fuel cell 11 is increased by controlling the supply state of the reactant gases having a relatively longer response delay. Thereby, hastening of degradation of the fuel cell 11 due to an excessive electrical current command being placed on the fuel cell 11 leading to a shortage in the supply of reactant gases can be prevented.

Moreover, even in the state of the driving force of the motor 16 being controlled by traction control, independently of the driving force of this motor 16, the power consumption of the motor 16 (that is, the motor-requested power PM) for controlling the supply state of the reactant gases in accordance with the accelerator opening degree AC corresponding to the accelerator manipulated variable of the driver is set based on the driver-requested torque TD and the revolution rate NM of the motor 16. Therefore, when for example returning from the execution state of traction control, that is, when shifting from the state of the driving force of the motor 16 changing in accordance with the TCS-required torque in traction control to the state of the driving force of the motor 16 changing in accordance with the driver-requested torque TD, a shortage in the generated power of the fuel cell 11, that is, a shortage in the supply of reactant gases, due to the motor-requested power PM abruptly increasing is prevented, and so hastening of degradation of the fuel cell 11 can be prevented.

Moreover, since the supply state of reactant gases to the fuel cell 11 changes in accordance with the motor-requested power PM, the operating state (for example, an operas sound or the like) of the air pump 18 consisting of, for example, an air compressor or the like, changes in accordance with the driver-requested torque TD, so that the driving intention of the driver is suitably reflected in the operating state of the fuel cell vehicle, and the driver is prevented from sensing any incongruity in the operating state of the fuel cell vehicle.

Figure 12:
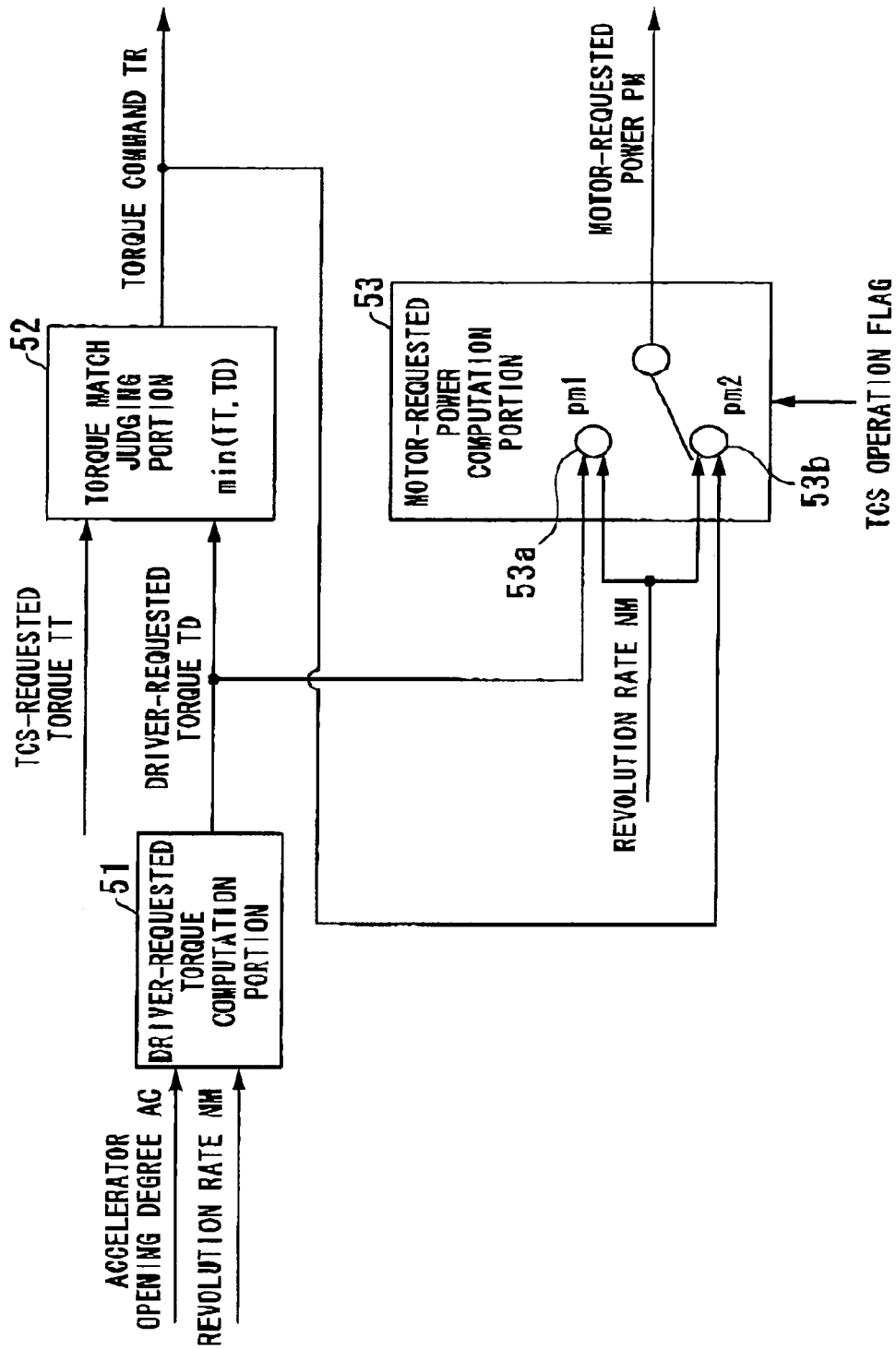
FIG. 12 is a block diagram of the driving torque calculation portion according to a first modification example of the second embodiment of the present invention.

In the control apparatus 10 for the fuel cell vehicle and the control method for the fuel cell vehicle according to the second embodiment of the present invention described above, irrespective of the torque command TR, that is, the TCS-requested torque TT, the motor-requested power PM was computed from the driver-requested torque TD and the revolution rate NM of the motor 16. However, without being limited thereto, the motor-requested power PM may be computed from either one of the torque command TR or the driver-requested torque TD selected in accordance with the flag value of the TCS operation flag, that is, with the execution state of traction control, and the revolution rate NM of the motor 16, as in the control apparatus 10 for the fuel cell vehicle and the control method for the fuel cell vehicle according to the first modification example of the second embodiment of the present invention shown, for example, in FIGS. 12 and 13.

In the first modification example of the second embodiment, the main points of difference with the above-described control apparatus 10 for the fuel cell vehicle and the control method for the fuel cell vehicle according to the second embodiment described above are the motor-requested power computation portion 53 of the driving torque calculation portion 43 and the motor-requested power computation process of step S01 shown in FIG. 3.

In the first modification example of the second embodiment, the motor-requested power computation portion 53 is equipped with a first requested power computation portion 53a that computes a first requested power pm1 based on the revolution rate NM output from the motor revolution rate sensor 35 and the driver-requested torque TD input from the driver-requested torque computation portion 51, and a second requested power computation portion 53b that computes a second requested power pm2 based on the revolution rate NM output from the motor revolution rate sensor 35 and the torque command TR input from the torque match judging portion 52. In accordance with the flag value of the TCS operation flag input from the TCSECU 22, in the case of a non-execution state of traction control with a flag value of "0", the first requested power pm1 calculated by the first requested power computation portion 53a is set as the motor-requested power PM, and in the case of an execution state of traction control with a flag value of "1", the second requested power pm2 calculated by the second requested power computation portion 53b is set as the motor-requested power PM.

The operation of the control apparatus 10 for the fuel cell vehicle, that is, the control method for the fuel cell vehicle, according to the first modification example of the second embodiment, particularly the above-mentioned motor-requested power computation process of step S01 shown in FIG. 3, is explained below with reference to the accompanying drawings.

Figure 13:
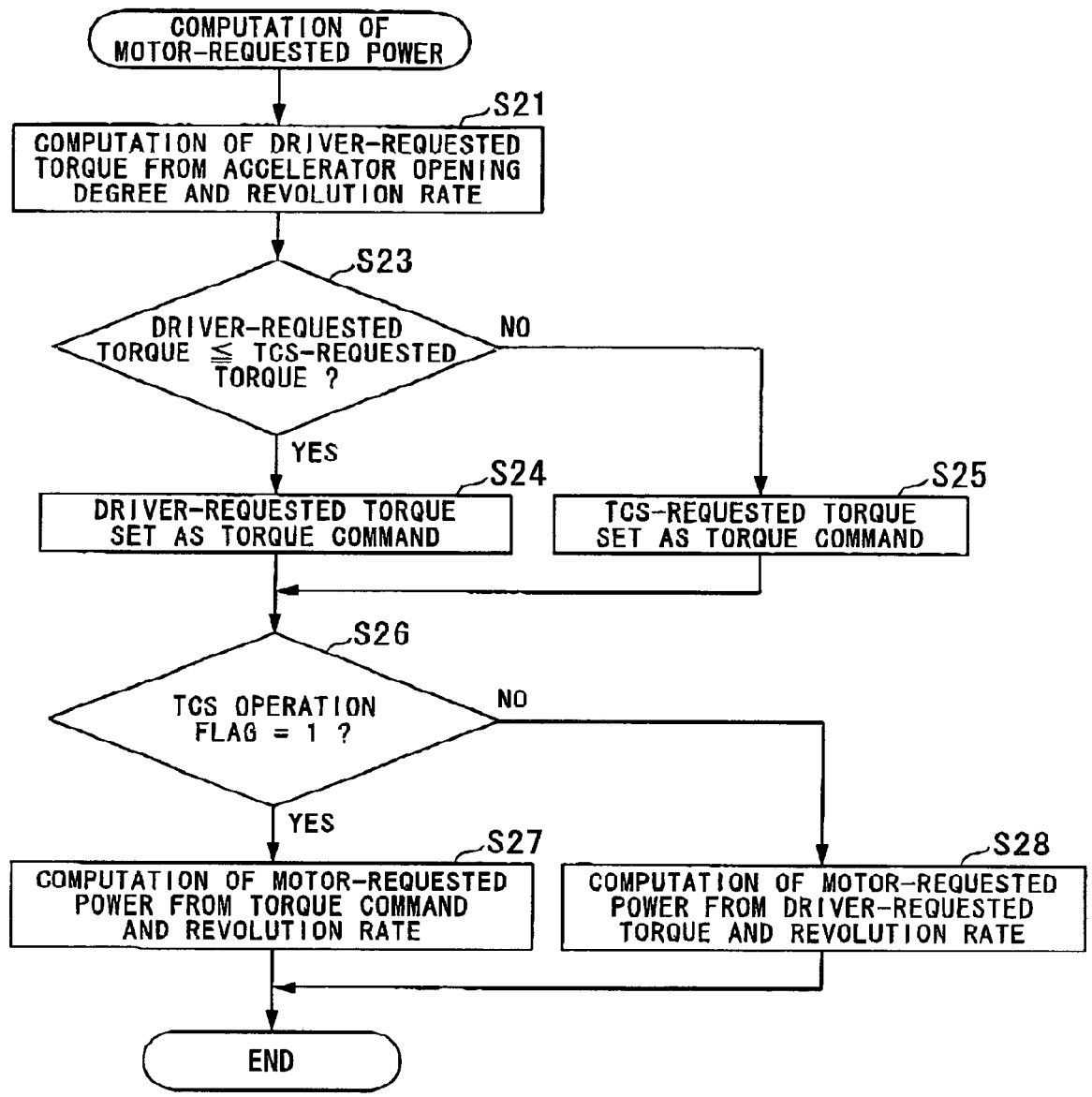
FIG. 13 is a flowchart showing the process of calculating the electrical power required by the motor according to the first modification example of the second embodiment of the present invention.

First, in step S21 shown for example in FIG. 13, based on the accelerator opening degree AC and the revolution rate NM of the motor 16, referring for example to the driver-requested torque map etc. that is set in advance, the driver-requested torque TD is computed as a command value for the torque output from the motor 16.

Next, in step S23, it is determined whether or not the computed driver-requested torque TD is less than or equal to the TCS-requested torque TT output from the TCSECU 22.

If the determination result is "YES", the processing proceeds to stop S24, wherein the drive-requested torque TD is set as the torque command TR, which a command value for the torque output from the motor 16, and the processing proceeds to step S26 to be hereinafter described.

If this determination result is "NO", the processing proceeds to step S25, wherein the TCS-requested torque TT is set as the torque command TR and then the processing proceed to step S26.

Next, in step S26, it is determined whether or not the flag value of the TCS operation flag is "1".

If the determination result is "YES", the processing proceeds to step S27, wherein the motor-requested power PM that indicates the power consumption of the motor 16 is computed based on the torque command TR and the revolution rate NM of the motor 16, and the series of processes terminates.

On the other hand, if this determination result is "NO", the processing proceeds to step S28, wherein the motor-requested power PM is computed based on the driver-requested torque TD and the revolution rate NM of the motor 16, and the series of processes terminates.

As described above, according to the control apparatus 10 for the fuel cell vehicle and the control method for the fuel cell vehicle according to the first modification example of the second embodiment of the present invention, during execution of traction control the motor-requested power PM was set in accordance with the torque command TR and the revolution rate NM of the motor 16. On the other hand, when traction control is not being executed, the motor-requested torque PM is set in accordance with the driver-requested torque TD and the revolution rate NM of the motor 16 regardless of the torque command TR, that is, the TCS-requested torque TT. Thereby, the motor-requested torque PM for controlling the supply state of the reactant gases can be set according to whether traction control is executed, and the power generation of the fuel cell 11 can be appropriately set in accordance with whether traction control is executed.

In the control apparatus 10 for the fuel cell vehicle and the control method for the fuel cell vehicle according to the second embodiment of the present invention described above, the motor-requested torque PM was simply computed from the driver-requested torque TD and the revolution rate NM of the motor 16 regardless of the torque command TR, that is, the TCS-requested torque TT, but are not limited thereto. The surplus power of the generated power of the fuel cell 11 exceeding the power consumption in the electrical load of the vehicle may be stored in the electrical storage apparatus 13 in accordance with the state of charge of the electrical storage apparatus 13, as in the operation of the control apparatus 10 of the fuel cell vehicle, that is, the control method for the fuel cell vehicle, according to the second modification example of the second embodiment of the present invention shown for example in FIG. 14.

In the second modification example of the second embodiment, the main point of difference with the above-described control apparatus 10 for the fuel cell vehicle and the control method for the fuel cell vehicle according to the second embodiment described above is the motor-requested power computation process of step S01 shown in FIG. 3.

The operation of the control apparatus 10 for the fuel cell vehicle, that is, the control method for the fuel cell vehicle, according to the second modification example of the second embodiment, particularly the above-mentioned motor-requested power computation process of step S01 shown in FIG. 3, is explained below with reference to the accompanying drawings.

Figure 14:
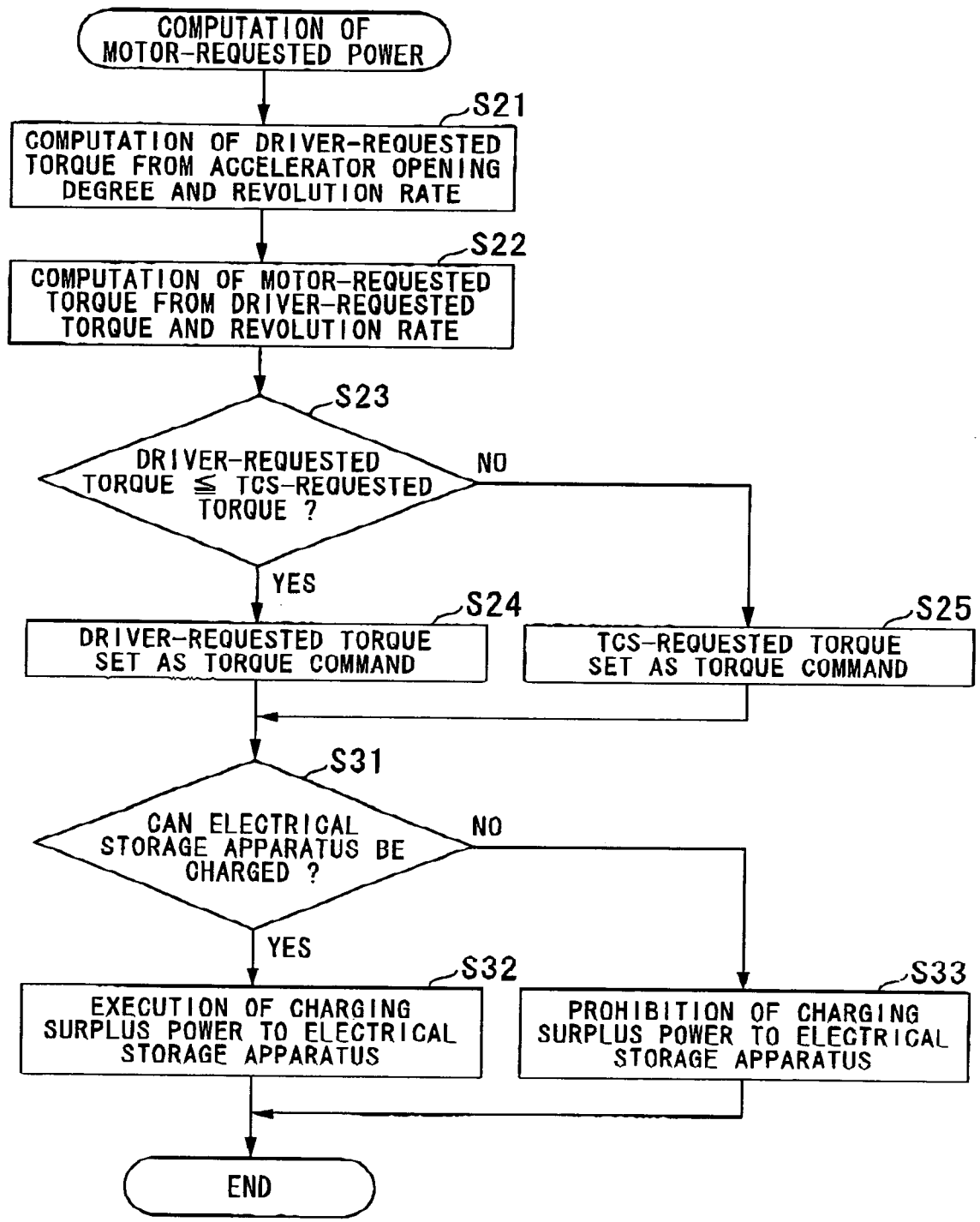
FIG. 14 is a flowchart showing the process of calculating the electrical power required by the motor according to a second modification example of the second embodiment of the present invention.

First, in step S21 shown for example in FIG. 14, based on the accelerator opening degree AC and the revolution rate NM of the motor 16, referring for example to the driver-requested torque map etc. that is set in advance, the driver-requested torque TD is computed as a command value for the torque output from the motor 16.

Next, in step S23, it is determined whether or not the computed driver-requested torque TD is less than or equal to the TCS-requested torque TT output from the TCSECU 22.

If the determination result is "YES", the processing proceeds to step S24, wherein the driver-requested torque TD is set as the torque command TR, which a command value for the torque output from the motor 16, and the processing proceeds to step S26 to be hereinafter described.

If this determination result is "NO", the processing proceeds to step S25, wherein the TCS-requested torque TT is set as the torque command TR, and then the processing proceeds to step S26.

Next, in step S26, it is determined whether or not the flag value of the TCS operation flag is "1".

If the determination result is "YES", the processing proceeds to step S27, wherein the motor-requested power PM that indicates the power consumption of the motor 16 is computed based on the torque command TR and the revolution rate NM of the motor 16, and then the processing proceeds to step S31.

On the other hand, if this determination result is "NO", the processing proceeds to step S28, wherein the motor-requested power PM is computed based on the driver-requested torque TD and the revolution rate NM of the motor 16, and then the processing proceeds to step S31.

In step S31, an integrated charge amount and an integrated discharge amount are computed by integrating the charge current and the discharge current of the electrical storage apparatus 13 for each specified period. The integrated charge amount and the integrated discharge amount are added or subtracted to/from the initial state or state of charge just before the s of charging/discharging to compute the state of charge of the electrical storage apparatus 13. Based on the computed state of charge, a determination is made as to whether or not it is possible to charge the electrical storage apparatus 13.

If the determination result is "YES", the processing proceeds to step S32, which charges the surplus power of the generated power of the fuel cell 11 exceeding the power consumption in the electrical load of the vehicle to the electrical storage apparatus 13 and then terminates the processing.

On the other hand, if this determination result is "NO", the processing proceeds to step S32, which prohibits charging of the surplus power of the generated power of the fuel cell 11 exceeding the power consumption in the electrical load of the vehicle to the electrical storage apparatus 13 and then terminates the processing.

As described above, according to the control apparatus 10 for the fuel cell vehicle and the control method for the fuel cell vehicle according to the second modification of the second embodiment of the present invention, even in the stale of the driving force of the motor 16 being controlled by traction control, the supply state of the reactant gases is controlled independently of the driving force of the motor 16. Therefore, a shortage in the generated power of the fuel cell, that is, a shortage in the supply of reactant gases, in which the response delay to an abrupt surge in the driving force of the motor 16 is relatively long, can be prevented, which can prevent hastening of degradation of the fuel cell 11, and a drop in the energy efficiency of the fuel cell vehicle as a whole can be suppressed.

Below is explained the result of comparing the control apparatus 10 for the fuel cell vehicle and the control method for the fuel cell vehicle according to the second embodiment described above, that is, the first embodiment that controls the supply state of the reactant gases regardless of the driving force of the motor 16 during execution of traction control, and a comparison example that controls the supply state of the reactant gases in accordance with the driving force of the motor 16 during execution of traction control.

Figure 15:
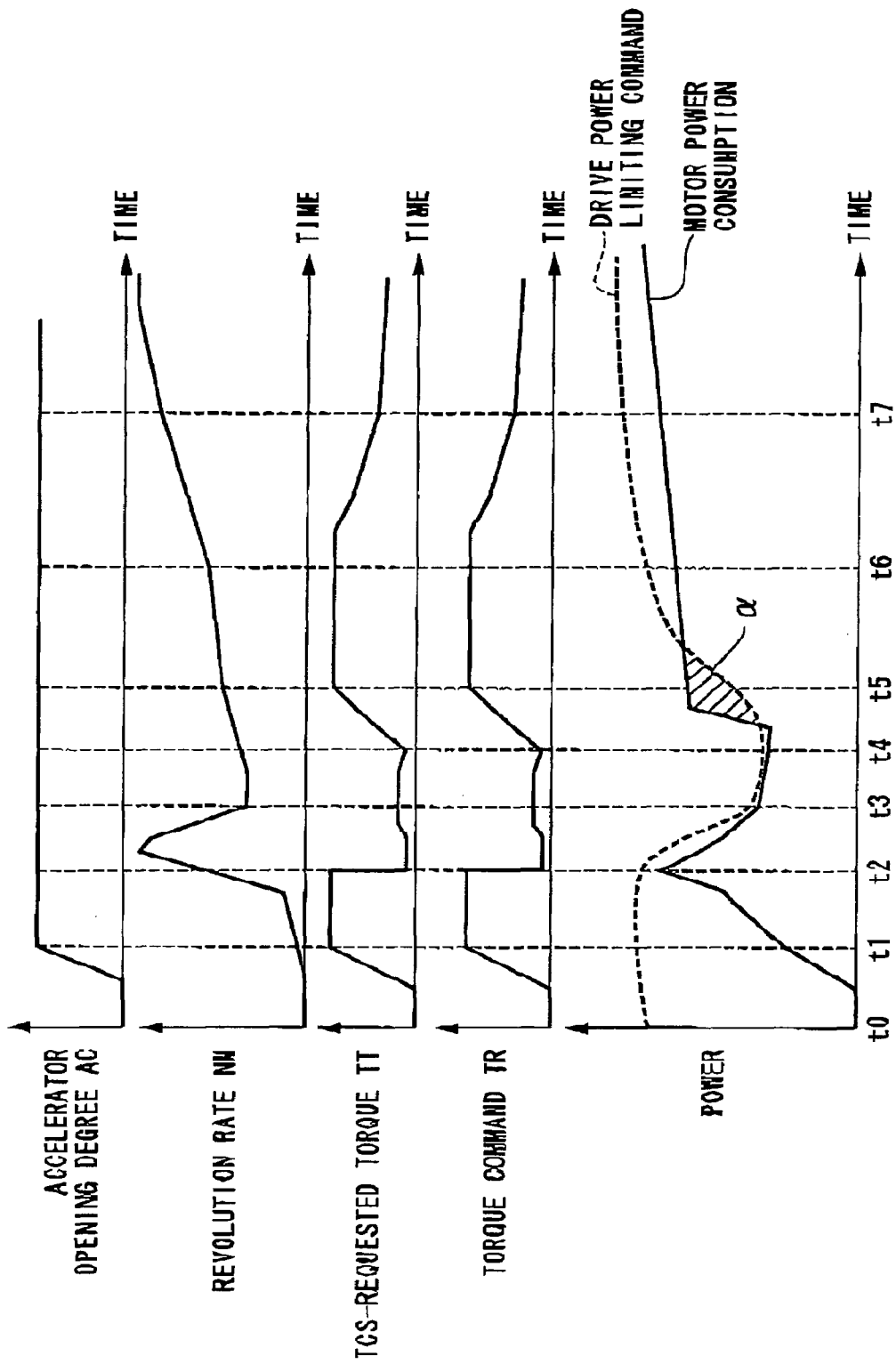
FIG. 15 is a graph showing an example of changes over time of the accelerator opening degrees the revolution rate of the motor, the torque required by the driver, the torque required by the TCS, the torque command, and the electrical power required by the motor according to a comparative example to the second embodiment of the present invention.

As shown for example in FIG. 15, during execution of traction control, in the comparative example that controls the supply state of the reactant gases in accordance with the driving force of the motor 16, the TCS-requested torque TT is set as the torque command TR, and the power consumption (i.e., the motor-requested power PM) of the motor 16 changes in accordance with this torque command TR, that is, the TCS-requested torque TT.

For this reason, as the revolution rate of the motor 16 gradually rises from time t0 to t2 in FIG. 15, the TCS-requested torque TT and the torque command TR are reduced in order to inhibit slippage of the drive wheels W. In response to the reduction of the torque command TR, the supply state of the reactant gases having a relatively longer response delay is changed, and the drive power limiting command, which indicates the limit on the power consumption of the motor 16 changes to a declining tendency in accordance with the upper limit value of the generated power that can be generated by the fuel cell 11.

Then, from time t4 onward, when the TCS-requested torque TT and the torque command TR increase in response to an increase in the grip force of the drive wheels W to the road surface, the power consumption (i.e., the motor-quested power PM) of the motor 16, which has a relatively short response delay, and the drive power limiting command, which has a relatively long response delay, change to an increasing tendency. Thereby, similarly to region a near time t5 in FIG. 15, there arises a case in which the power consumption of the motor 16 becomes larger than the drive power limiting command.

Figure 16:
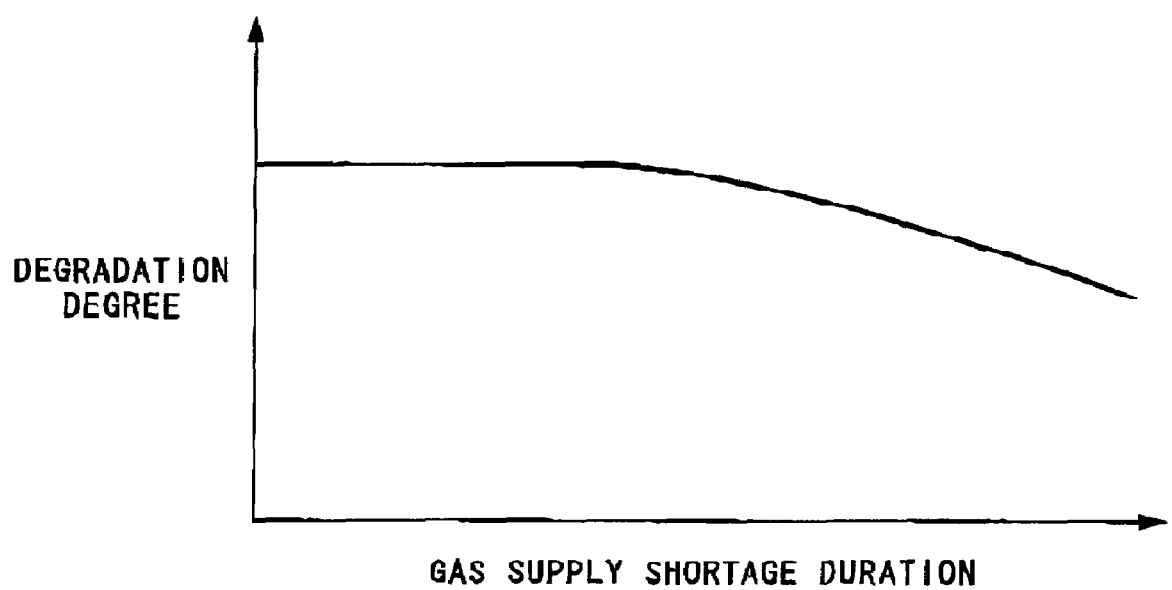
FIG. 16 is a graph showing an example of the correspondence between the gas supply shortage time and the degree of deterioration for a fuel cell according to a comparative example with respect to the second embodiment of the present invention.

When the power consumption of the motor 16 larger than the drive power limiting command and the output curt corresponding to the power consumption of the motor 16 is taken from the fuel cell 1, a shortage in the supply of the reactant gases to the fuel cell 11 results. As the duration of this gas supply shortage increases, degradation of the fuel cell 11 is hastened as shown in FIG. 16.

That is, by controlling the supply state of the reactant gases irrespective of the driving force of the motor 16 when traction control is being executed as in the control apparatus 10 for the fuel cell vehicle and the control method for the fuel cell vehicle according to the second embodiment described above, hastening of degradation of the fuel cell 11 can be prevented.

Figure 17:
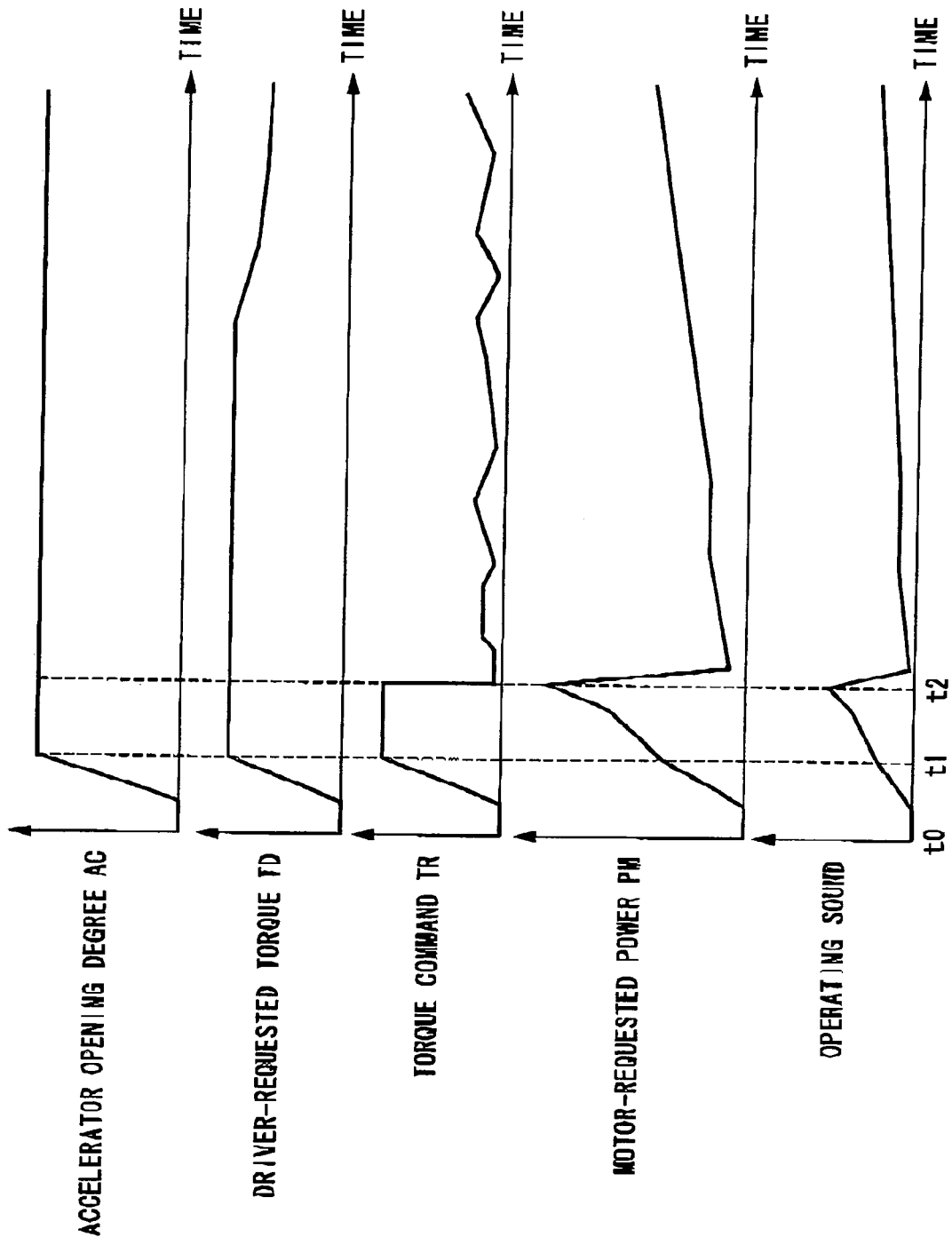
FIG. 17 is a graph showing an example of the changes over time of the accelerator opening degree, the driver-requested torque, the torque command, the torque required by the motor, and the operating sound of the air pump in the case of computing the electrical power required by the motor based on the torque command in the comparative example with respect to the second embodiment of the present invention.

Also, since the motor-requested power PM changes in accordance with the torque command TR in the comparative example, the operating sound of the air pump 18 consisting of, for example, an air compressor changes in accordance with the torque command TR. Even for a state in which the driver-requested torque TD maintains a specified value or changes to a decreasing tendency as appears from time t2 onward in FIG. 17, the operating sound of the air pump 18 changes to an increasing tendency as the torque command TR changes to an increasing tendency, irrespective of the driver-requested torque TD. For this reason, the driving intention of the driver is not suitably reflected in the operating state of the fuel cell vehicle, leading to the driver sensing incongruity in the operating state of the fuel cell vehicle.

Figure 18:
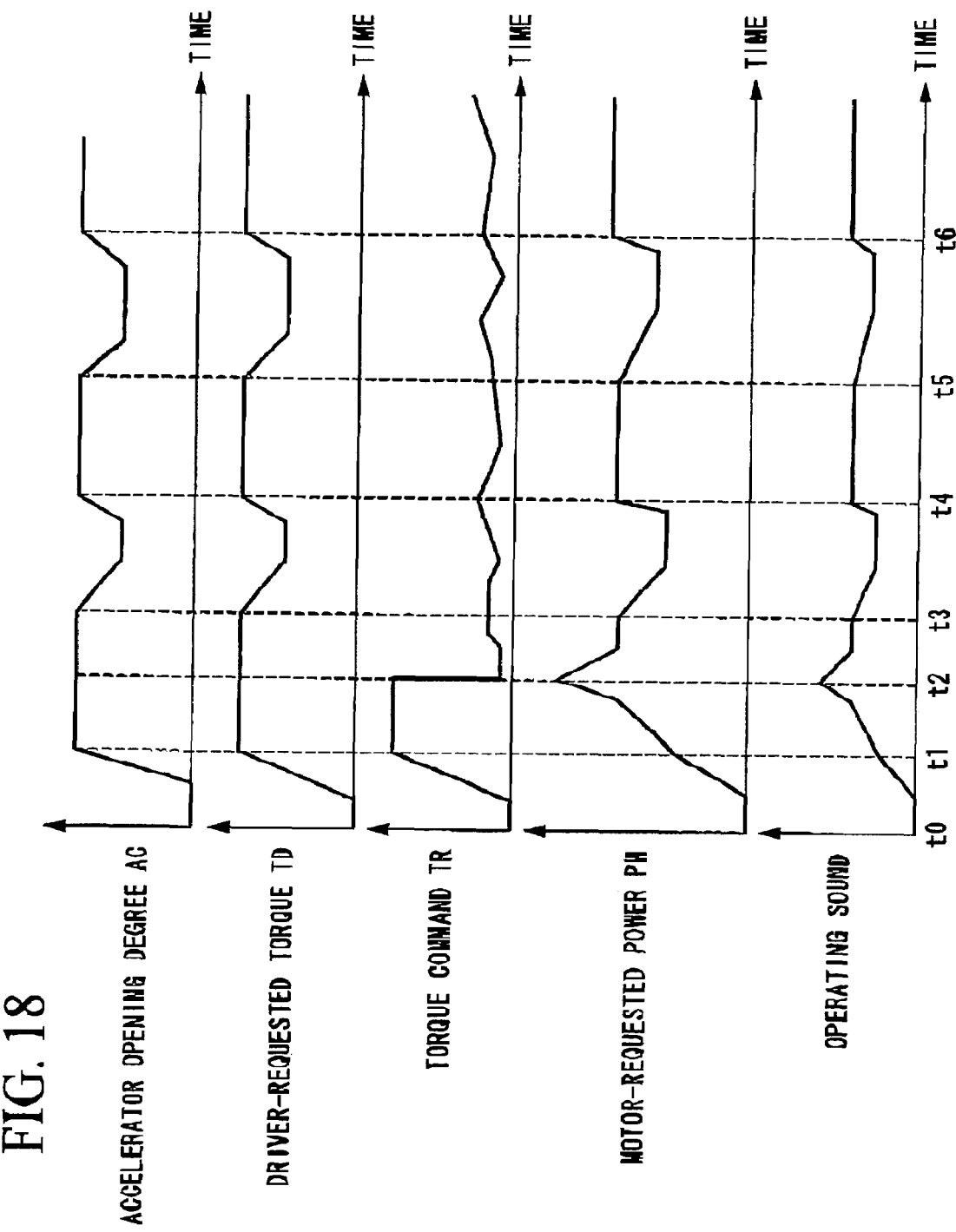
FIG. 18 is a graph showing an example of the changes over time of the accelerator opening degree, the driver-requested torque, the torque command, the torque required by the motor, and the operating sound of the air pump in the case of computing the electrical power required by the motor based on the driver-requested torque in the second embodiment of the present invention.

In contrast, in the second embodiment described above, even in the state in which the TCS-requested torque TT is set as the torque command TR for inhibiting slippage of the drive wheels W from time t2 onward as shown in FIG. 18, the motor-requested power PM and the operating sound of the air pump 18 change according to the driver-requested torque TD. For this reason, the driving intention of the driver is suitably reflected in the operating state of the fuel cell vehicle so that the driver is prevented from sensing any incongruity in the operating sate of the fuel cell vehicle.

Below is explained the result of comparing the fuel efficiency of the control apparatus 10 for the fuel cell vehicle and the control method for the fuel cell vehicle according to the second embodiment described above, that is, the first embodiment that controls the supply state of the reactant gases regardless of the driving force of the motor 16 during execution of traction control, a comparison example that controls the supply state of the reactant gases in accordance with the driving force of the motor 16 during execution of traction control, and the control apparatus 10 for the fuel cell vehicle and the control method for the fuel cell vehicle according to the second modification example of the second embodiment, that is, the second embodiment that controls the supply state of the reactant gases regardless of the driving force of the motor 16 during execution of traction control and charges the surplus power of the generated power of the fuel cell 11 exceeding the power consumption in the electrical load of the vehicle to the electrical storage apparatus 13 in accordance with the state of charge of the electrical storage apparatus 13.

Figure 19:
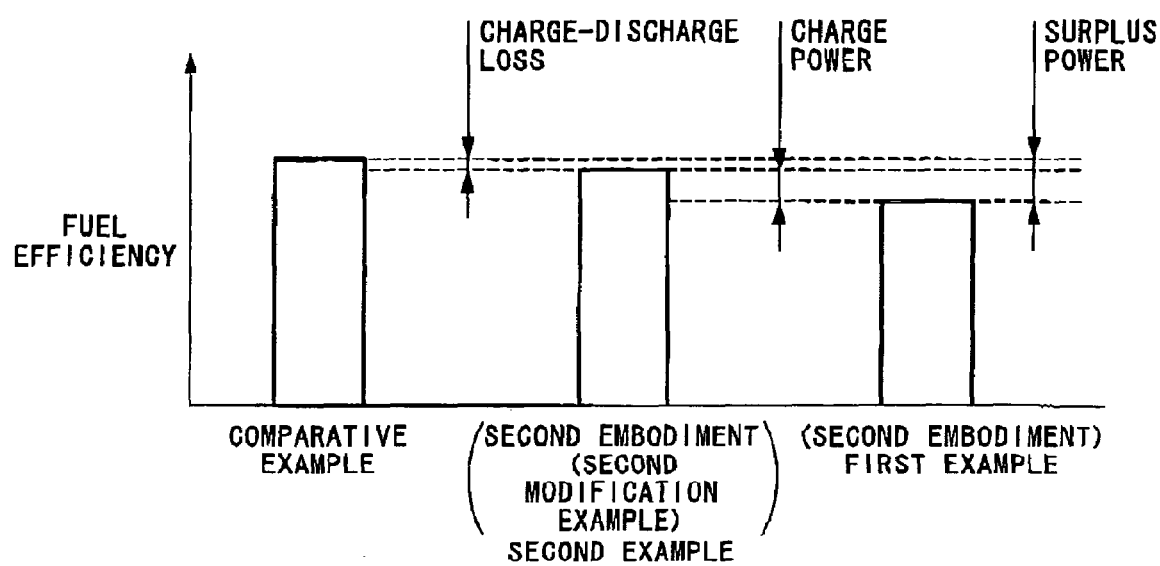
FIG. 19 is a graph showing examples of fuel efficiency of a fuel cell vehicle according to a comparative example with respect to the second embodiment of the present invention, fuel efficiency of a fuel cell vehicle according to the second embodiment of the present invention, and fuel efficiency of a fuel cell vehicle according to the second modification example of the second embodiment of the present invention.

For example, as shown in FIG. 19, first, with respect to the comparison example, in the first embodiment the generated power of the fuel cell 11 exceeding the power consumption in the motor 16 and the electrical load of the vehicle becomes surplus power, and so the fuel efficiency decreases by this surplus power.

In contrast to the embodiment, in the second embodiment, when the electrical storage apparatus 13 can be charged, the surplus power is charged to the electrical storage apparatus 13. Therefore, the loss accompanying this charging operation (charge-discharge loss) is subtracted from the surplus power, so that the fuel efficiency rises to the extent of the obtained charging power.

In other words, with respect to the comparative example, a drop in fuel efficiency can be inhibited while preventing hastening of degradation of the fuel cell 11 in the second embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the ended claims.

What is claimed is:

1. A control a for a fuel cell vehicle comprising:
   a motor for driving the fuel cell vehicle;
   a motor control unit that controls driving and regenerative operations of the motor;
   a traction control unit that suppresses slippage of drive wheels by controlling driving force a between tires and a road surface;
   a fuel cell that generates electricity through electrochemical reaction by being supplied with reactant gases by a reactant gas supply unit and supplies electrical power to the motor;
   an electrical storage apparatus that is charged by power generated by the fuel cell and power regenerated by the motor;
   an output control unit that controls the output of the fuel cell; and
   a control unit that controls power consumption of the motor in advance of a change in a supply state of the reactant gases to the fuel cell due to execution of driving force control by the traction control unit.

2. The control apparatus for a fuel cell vehicle according to claim 1, wherein the control unit controls the supply state of the reactant gases in accordance with the power consumption of the motor when driving force control is executed by the traction control unit.

3. The control apparatus for a fuel cell vehicle according to claim 2, further comprising a revolution rate sensor that measures a revolution rate of the motor,
   wherein the control unit computes the power consumption of the motor based on a torque command for torque output from the motor and on the revolution rate measured by the revolution rate sensor.

4. The control apparatus for a fuel cell vehicle according to claim 2, further comprising:
   a revolution rate sensor that measure a revolution rate of the motor; and
   an accelerator opening degree sensor that measures an accelerator opening degree corresponding to an amount of operation of an accelerator applied by a driver, wherein
   the control unit computes, when executing driving force control by the traction control unit, the power consumption of the motor based on a traction-control-requested torque corresponding to the driving force control by the traction control unit, which is a command value for torque output from the motor, and on the revolution rate measured by the revolution rate sensor, and
   computes, when driving force control is not executed by the traction control unit, the power consumption of the motor based on a driver-requested torque corresponding to the accelerator opening degree measured by the accelerator opening degree sensor, which is a command value for torque output from the motor, and on the revolution rate measured by the revolution rate sensor.

5. The control apparatus for a fuel cell vehicle according to claim 1, wherein the control unit controls a supply state of the reactant gases when driving force control is executed by the traction control unit, irrespective of the driving force of the motor.

6. The control apparatus for a fuel cell vehicle according to claim 5, further comprising an accelerator opening degree sensor that measures an accelerator opening degree corresponding to an amount of operation of an accelerator applied by a driver,
   wherein the control unit controls the supply state of the reactant gases in accordance with the accelerator opening degree measured by the accelerator opening degree sensor when driving force control is executed by the traction control unit.

7. The control apparatus for a fuel cell vehicle according to claim 6, further comprising a revolution rate sensor that measures the revolution rate of the motor,
   wherein the control unit computes the power consumption of the motor based on the driver-requested torque corresponding to the accelerator opening degree measured by the accelerator opening degree sensor, which is a command value for torque output from the motor, and the revolution rate measured by the revolution rate sensor.

8. The control apparatus for a fuel cell vehicle according to claim 6, further comprising a revolution rate sensor that measures the revolution rate of the motor,
   wherein the control unit
   computes, when driving force control is executed by the traction control unit, the power consumption of the motor based on a driver-requested torque corresponding to the accelerator opening degree measured by the accelerator opening degree sensor, which is a command value for torque output from the motor, and the revolution rate measured by the revolution rate sensor, and
   computes, when driving force control is not executed by the traction control unit, the power consumption of the motor based on a torque command for torque output from the motor, and the revolution rate measured by the revolution rate sensor.

9. The control apparatus for a fuel cell vehicle according to claim 5, further comprising:
   a state of charge measuring unit that measures a state of charge of the electrical storage apparatus; and
   a charging control unit that controls surplus power of an electrical output of the fuel cell exceeding power consumption in an electrical load of the vehicle to be charged to the electrical storage apparatus, in accordance with the state of charge measured by the state of charge measuring unit during execution of the driving force control by the traction control unit.

10. A control method for a fuel cell vehicle, the fuel cell vehicle comprising:
    a motor for driving the fuel cell vehicle;
    a motor control unit that controls driving and regenerative operations of the motor;
    a traction control unit that suppresses slippage of drive wheels by controlling driving force acting between tires and a road surface;
    a fuel cell that generates electricity through electrochemical reaction by being supplied with reactant gases by a reactant gas supply unit and supplies electrical power to the motor;

an electrical storage apparatus that is charged by power generated by the fuel cell and power regenerated by the motor; and an output control unit that controls the output of the fuel cell, the control method comprising a step of controlling power consumption of the motor in advance of a change in a supply state of the reactant gases to the fuel cell accompanying the start of execution of driving force control by the traction control unit.

11. The control method for a fuel cell vehicle according to claim 10, further comprising a step of controlling the supply state of the reactant gases in accordance with the power consumption of the motor when driving force control is executed by the traction control unit.

12. The control method for a fuel cell vehicle according to claim 11, further comprising a step of computing the power consumption of the motor based on a torque command for torque output from the motor and on a revolution rate of the motor.

13. The control method for a fuel cell vehicle according to claim 11, further comprising a step of computing, when executing driving force control by the traction control unit, the power consumption of the motor based on a traction-control-requested torque corresponding to the driving force control by the traction control unit, which is a command value for torque output from the motor, and on a revolution rate of the motor, and computing, when driving force control is not executed by the traction control unit, the power consumption of the motor based on a driver-requested torque corresponding to an amount of operation of an accelerator applied by a driver, which is a command value for torque output from the motor, and on the revolution rate of the motor.

14. The control method for a fuel cell vehicle according to claim 10, further comprising a step of controlling the supply state of the reactant gases when driving force control is executed by the traction control unit, irrespective of the driving force of the motor.

15. The control method for a fuel cell vehicle according to claim 14, further comprising a step of controlling the supply state of the reactant gases in accordance with an accelerator opening degree corresponding to an amount of operation of an accelerator applied by a driver when driving force control is executed by the traction control unit.

16. The control method for a fuel cell vehicle according to claim 15, further comprising a step of computing the power consumption of the motor based on the driver-requested torque corresponding to the accelerator opening degree, which is a command value for torque output from the motor, and on a revolution rate of the motor.

17. The control method for a fuel cell vehicle according to claim 15, further comprising a step of computing, when driving force control is executed by the traction control unit, the power consumption of the motor based on a driver-requested torque corresponding to the accelerator opening degree, which is a command value for torque output from the motor, and on a revolution rate of the motor, and computing, when driving force control is not executed by the traction control unit, the power consumption of the motor based on a torque command for torque output from the motor, and on the revolution rate of the motor.

18. The control method for a fuel cell vehicle according to claim 14, further comprising a step of charging surplus power of an electrical output of the fuel cell exceeding power consumption in an electrical load of the vehicle to the electrical storage apparatus, in accordance with a state of charge of the electrical storage apparatus during execution of the driving force control by the traction control unit.

* * * * *